US008965099B2

(12) United States Patent
Koretsune et al.

(10) Patent No.: US 8,965,099 B2
(45) Date of Patent: Feb. 24, 2015

(54) PAPER SHEET RECOGNITION APPARATUS AND PAPER SHEET RECOGNITION METHOD

(75) Inventors: Hideyuki Koretsune, Hyogo (JP); Masakane Nagaki, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 301 days.

(21) Appl. No.: 13/546,164

(22) Filed: Jul. 11, 2012

(65) Prior Publication Data

US 2013/0016893 A1 Jan. 17, 2013

(30) Foreign Application Priority Data

Jul. 13, 2011 (JP) ................................ 2011-154915

(51) Int. Cl.
*G06K 9/00* (2006.01)
*G07D 7/12* (2006.01)
*G07D 7/00* (2006.01)
*G07D 7/20* (2006.01)

(52) U.S. Cl.
CPC .............. *G07D 7/121* (2013.01); *G07D 7/0006* (2013.01); *G07D 7/0046* (2013.01); *G07D 7/124* (2013.01); *G07D 7/2058* (2013.01)
USPC .......................................................... 382/137

(58) Field of Classification Search
None
See application file for complete search history.

(56) References Cited

U.S. PATENT DOCUMENTS 4,402,150 A 9/1983 Sullivan
4,765,656 A 8/1988 Becker et al.
5,248,544 A 9/1993 Kaule
5,631,039 A * 5/1997 Knight et al. ...................... 427/7
6,036,233 A 3/2000 Braun et al.
6,473,165 B1 10/2002 Coombs et al.
7,333,268 B2 2/2008 Steenblik et al.
2005/0217969 A1* 10/2005 Coombs et al. ............... 194/206
2007/0058260 A1 3/2007 Steenblik et al.

FOREIGN PATENT DOCUMENTS

JP 2007-213210 8/2007
JP 2009-116857 5/2009
JP 2011-129083 6/2011
WO WO 2004/013817 * 2/2004 ............... G07D 7/12
WO WO 2004/013817 A2 2/2004

OTHER PUBLICATIONS

European Search Report (Application No. 12176138.1) (7 pages—dated Nov. 23, 2012).

* cited by examiner

*Primary Examiner* — Amara Abdi
(74) *Attorney, Agent, or Firm* — Renner, Kenner, Grieve, Bobak, Taylor & Weber

(57) ABSTRACT

A paper sheet recognition apparatus recognizes whether a paper sheet has a motion thread that is a thread part in which a pattern varies with a viewing angle. The paper sheet recognition apparatus includes multiple light sources that irradiate the paper sheet with lights from corresponding multiple directions, a line sensor that receives reflected light reflected from the paper sheet that is irradiated with the lights from the multiple directions by the light sources, an image processing unit that creates, based on an output signal that is outputted by the line sensor, multiple paper sheet images captured by using the light irradiated by the light source from each direction, and a recognition unit that judges whether the motion thread is present by comparing each image of the thread part included in each of the paper sheet images created by the image processing unit.

14 Claims, 14 Drawing Sheets

PAPER SHEET RECOGNITION APPARATUS AND PAPER SHEET RECOGNITION METHOD

TECHNICAL FIELD

The present invention relates to a paper sheet recognition apparatus and a paper sheet recognition method that recognizes a paper sheet having a motion thread, which includes a pattern that varies with a viewing angle, embedded therein. More particularly, the present invention relates to a paper sheet recognition apparatus and a paper sheet recognition method that recognizes the paper sheet by judging the presence or absence of the motion thread based on a captured image of the motion thread.

BACKGROUND ART

To prevent counterfeiting of paper sheets, a technology in which a motion thread is used is known in the art. The motion thread is a type of a thread that is used in paper sheets. The motion thread is sometimes simply referred to as motion, or, because the motion thread enhances security of the paper sheets, it is also referred to as a security ribbon.

The motion thread is formed by arranging a micro-lens, such as, a lenticular lens, on a plurality of micro-images, called icons, via an optical spacer. Details of a structure and optical properties of a motion thread are disclosed in, for example, U.S. Pat. No. 7,333,268.

The motion thread is used by embedding in the paper sheet so as to form, for example, a small strip region on the paper sheet. When the paper sheet is tilted while looking at a pattern on a motion thread part, the pattern seems to move with the movement of the paper sheet. With this feature, it can be judged under a visible light whether the paper sheet is a counterfeit or not. Therefore, a technology whereby it can be judged speedily and accurately whether a paper sheet includes a motion thread is desirable for the paper sheet recognition apparatus.

The pattern appeared the motion thread part differs according to structures, etc., of the icons and the micro-lens. Meanwhile, apart from cases where the same pattern appears to be moving when the paper sheet is being tilted, there are cases where different patterns appear depending on an angle of tilt of the paper sheet.

To judge the presence ox absence of the motion thread in the paper sheet, a method can be conceived in which a recognition technology relating to holograms or color shift inks of which patterns and color vary with a viewing angle is used, however, the principle thereof differs from that of the motion thread. For example, the conventional technology for recognizing the holograms, etc., is disclosed in Japanese Patent Application Laid-open No. 2007-213210. Specifically, a paper sheet is irradiated with light using a single phototransmitter and a light reflected by a surface of the paper sheet is received by a plurality of photoreceivers and analyzed, and authenticity of the paper sheet is judged based on the result of the analysis. For example, multiple diffraction reflection lights produced when the hologram is irradiated with light are received by the photoreceivers and analyzed to judge the authenticity of the paper sheet.

Because the above-described conventional technology is relating to the holograms, etc., a recognition device and a recognition method adapted to the conventional technology cannot be used as it is for recognition of the motion thread. Specifically, an arrangement of an optical source and sensors of the device and a data processing method need to be optimized to cope with the features of the motion thread.

In the above-described conventional technology, multiple light-receiving elements are required, which leads to an increase in a size of the device as well as a manufacturing cost. Specifically, the light receiving elements are required in a number equal to the number of the reflected lights to be measured, and a scale of circuitry also increases for processing signals measured by each light receiving element, and as a result, the manufacturing cost increases. The cost further increases when an optical system, such as, an SLA (Selfoc Lens Array), is required between the light receiving element and the paper sheet. Moreover, the size of the device increases due to an increase in the number of constituent elements, such as, the light receiving elements, and the optical system, and an enlargement in the scale of circuitry.

SUMMARY OF THE INVENTION

It is an object of the present invention to provide a solution to the problems presented by the conventional technology. Specifically, it is an object to provide a paper sheet recognition apparatus, which is compact in size and can be manufactured at a low cost, and a paper sheet recognition method that judge the presence or absence of the motion thread on a surface of the paper sheet speedily and accurately.

According to an aspect of the present invention, a paper sheet recognition apparatus recognizes a paper sheet having a motion thread in a thread part of which a pattern varies with a viewing angle. The paper sheet recognition apparatus includes a first light source that irradiates the paper sheet with a light from a first direction; a second light source that irradiates the paper sheet with a light from a second direction that is different from the first direction; a light source controller that controls the first light source and the second light source so that the paper sheet is irradiated with the light from the first direction or the second direction; a transport mechanism that transports the paper sheet; a line sensor that receives a reflected light reflected from the paper sheet that is being transported by the transport mechanism and that is irradiated with the lights from the first direction and the second direction; an image processing unit that creates, based on an output signal outputted from the line sensor, a first image captured by using the first light source and a second image captured by using the second light source; and a recognition unit that judges that the paper sheet has the motion thread if a first thread image, which is an image of the thread part included in the first image, and a second thread image, which is an image of the thread part included in the second image, are different.

According to another aspect of the present invention, the line sensor is arranged at a position above a surface of the paper sheet that is being transported by the transport mechanism and that has the motion thread thereon, the position is tilted by a predetermined angle from a plane that is substantially perpendicular to a transport plane of the paper sheet and is on a side opposite to the first and second directions from which the lights irradiate the paper sheet.

According to still another aspect of the present invention, the paper sheet recognition apparatus further includes a shutter mechanism that is capable of separately blocking the lights irradiated towards the paper sheet from the first direction and the second direction. The first light source and the second light source are realized by using a single light guiding body that emits a light towards the paper sheet from the first direction and the second direction. The light source controller controls the shutter mechanism such that the paper sheet is irradiated with the light from the first direction or the second direction.

According to still another aspect of the present invention, the paper sheet recognition apparatus further includes a third light source that irradiates a light from a side different from that of the line sensor relative to the transport plane of the paper sheet. The image processing unit creates a transmitted image of the paper sheet by using the third light source. The recognition unit identifies a position of the thread part based on the transmitted image created by the image processing unit.

According to still another aspect of the present invention, the recognition unit identifies a type of the paper sheet and a position of the thread part according to the type of the paper sheet.

According to an aspect of the present invention, the recognition unit calculates a difference value between pixel values of the first thread image and those of the second thread image, and judges that the paper sheet has the motion thread and when the calculated difference value is greater than a predetermined threshold value.

According to still another aspect of the present invention, the paper sheet recognition apparatus further includes a storage unit that stores therein a reference image corresponding to each of the first thread image and the second thread image. The recognition unit judges that the paper sheet has the motion thread if the first thread image and the second thread image match with the corresponding reference images.

According to still another aspect of the present invention, the recognition unit judges that the paper sheet has the motion thread if an image obtained by shifting the first thread image by a predetermined distance in a predetermined direction, based on a relation between the first direction and the second direction from where the lights are irradiated towards the paper sheet, matches with the second thread image.

According to still another aspect of the present invention, a paper sheet recognition method is a method for recognizing a paper sheet having a motion thread in a thread part of which a pattern varies with a viewing angle. The method includes first image capturing including capturing an image of the paper sheet by irradiating the paper sheet with a light from a first direction; second image capturing including capturing an image of the paper sheet by irradiating the paper sheet with a light from a second direction that is different from the first direction; first comparing including comparing a first thread image, which is an image of the thread part included in a first image captured at the first image capturing, with a second thread image, which is an image of the thread part included in a second image captured at the second image capturing; and judging that the paper sheet has the motion thread when a comparison result obtained at the first comparing shows that the two images are different.

According to still another aspect of the present invention, the first image capturing and the second image capturing include capturing the image of the paper sheet from a position above a surface of the paper sheet that has the thread thereon, the position is tilted by a predetermined angle from a plane that is substantially perpendicular to a transport plane of the paper sheet and is on a side opposite to the first and second directions from which the lights irradiate the paper sheet.

According to still another aspect of the present invention, the paper sheet recognition method further includes transmitted image capturing including capturing a transmitted image of the paper sheet; and first thread position identifying including identifying a position of the thread part based on the transmitted image captured at the transmitted image capturing. The first comparing includes extracting and comparing an image of the motion thread, based on position information identified at the first thread position identifying.

According to still another aspect of the present invention, the paper sheet recognition method further includes a second thread position identifying including identifying a type of the paper sheet and identifying a position of the thread part according to the type of the paper sheet. The first comparing includes extracting and comparing the first thread image and the second thread image based on position information identified at the second thread position identifying.

According to still another aspect of the present invention, the first comparing includes calculating a difference between pixel values of the first thread image and the second thread image. The judging includes judging that the paper sheet has the motion thread when calculated difference value obtained at the first comparing is greater than a predetermined threshold value.

According to still another aspect of the present invention, the first comparing includes comparing the first thread image and the second thread image with a corresponding reference image. The judging includes judging that the paper sheet has the motion thread when a comparison result obtained at the first comparing shows that the two images are matching.

According to still another aspect of the present invention, the paper sheet recognition method further includes a second comparing including comparing an image obtained by shifting the first thread image within a predetermined range with the second thread image. The judging includes judging that the paper sheet has the motion thread when a comparison result obtained at the first comparing show that the two images are different and a comparison result obtained at the second comparing shows that the two images are matching.

According to still another aspect of the present invention, a paper sheet recognition apparatus recognizes a paper sheet having a motion thread that in a thread part of which a pattern varies with a viewing angle. The paper sheet recognition apparatus includes a line sensor that receives a reflected light reflected from the paper sheet that is irradiated with the light from the light source from each direction; an image processing unit that creates, based on an output signal outputted from the line sensor, a plurality of paper sheet images captured by using the light irradiated by the light source from each direction; and a recognition unit that judges whether the paper sheet has the motion thread by comparing the images of the thread part included in the paper sheet images created by the image processing unit.

BEST MODE(S) FOR CARRYING OUT THE INVENTION

Exemplary embodiments of a paper sheet recognition apparatus and a paper sheet recognition method according to the present invention are explained in detail below with reference to the accompanying drawings. The paper sheet recognition apparatus judges the presence or absence of a motion thread in a paper sheet to be recognized while performing recognition of the paper sheet. The technology is applicable to any paper sheet having the motion thread embedded therein regardless of the type of the paper sheet.

[First Embodiment]

The paper sheet recognition apparatus according to an embodiment of the present invention is explained first. The motion thread has a property that a pattern on the motion thread varies with a viewing angle. With this property, the present embodiment uses the fact that by fixing a sensor position from where an image of the motion thread is captured and moving a light source, an image of the motion thread part that is observed from the sensor position varies. That is, the paper sheet is irradiated with lights from two different directions, two images of the motion thread part captured by using the light irradiated from each direction are compared, and depending on whether the two images are different, judgment is made whether the paper sheet has the motion thread. The present embodiment is explained in detail below.

Figure 1:
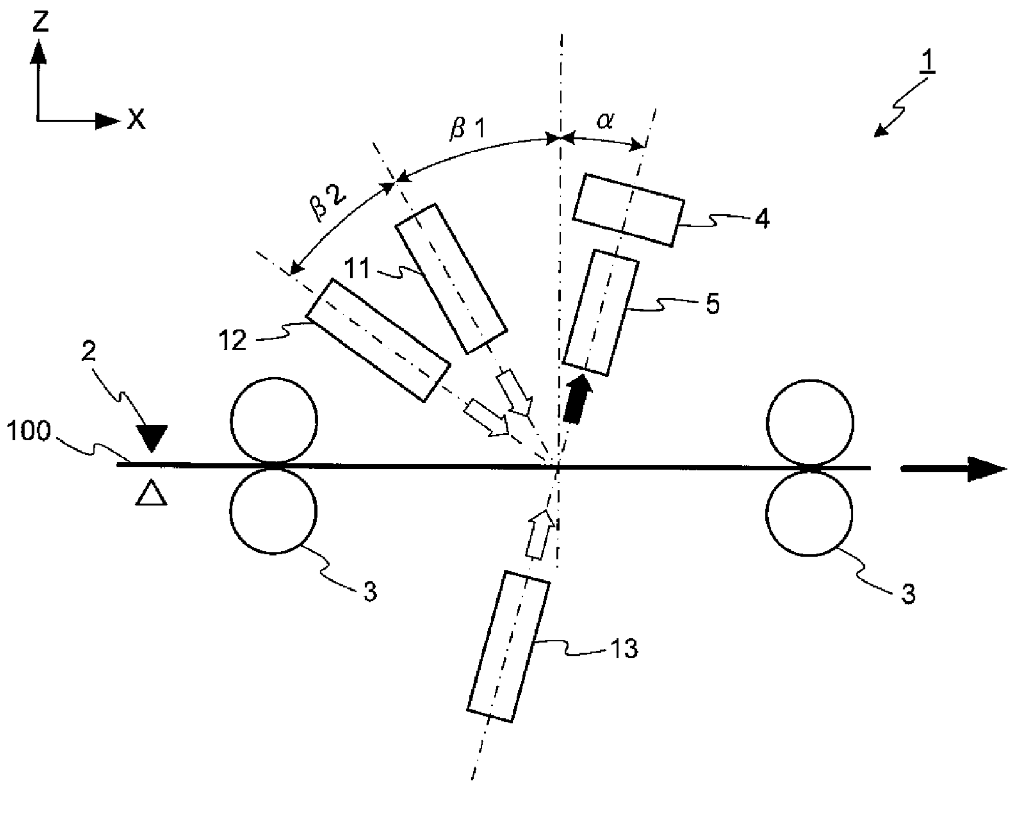
FIG. 1 is a schematic diagram for explaining an overview of a paper sheet recognition apparatus according to a first embodiment of the present invention.

FIG. 1 is a schematic diagram for explaining an overview of a paper sheet recognition apparatus 1. The paper sheet recognition apparatus 1 includes a timing sensor 2 that detects an arrival of a paper sheet 100, rollers (transport mechanism) 3 that transport the paper sheet 100, a first light source 11, a second light source 12, and a third light source 13 that irradiate the paper sheet 100 being transported with lights, a line sensor 4 that receives a reflected light reflected from a surface of the paper sheet 100 and a transmitted light that has passed through the paper sheet 100, and an optical system 5 for guiding the reflected light and the transmitted light received from the paper sheet 100 to the line sensor 4.

The timing sensor 2 detects the arrival of the paper sheet 100 to be recognized, and is used for determining a timing for starting processes relating to the paper sheet 100. The timing sensor 2 includes, for example, a light irradiation unit and a light receiving unit. The paper sheet 100 that is being transported between the light irradiation unit and the light receiving unit blocks the light irradiated from the light irradiation unit and received by the light receiving unit, and as a result, the arrival of the paper sheet 100 is detected. Upon detection of the arrival of the paper sheet 100 to be processed, a process of capturing an image of the paper sheet 100 starts. The details of the process are described later.

The rollers 3 function as the transport mechanism that transports the paper sheet 100 in the paper sheet recognition apparatus 1. As shown in FIG. 1, the paper sheet 100 is transported in a +X-axis direction by a clock-wise rotation of the rollers 3 from two rollers arranged along a Z-axis direction. Furthermore, the paper sheet 100 is transported in a −X-axis direction by a counter-clockwise rotation of the rollers 3. The paper sheet 100 received in the paper sheet recognition apparatus 1 is transported by a plurality of the rollers 3 arranged inside the device so that the paper sheet 100 passes below the line sensor 4 and is discharged to the outside of the apparatus.

The line sensor 4 has a function of capturing an image of the paper sheet 100 being transported. Specifically, for example, each of the light sources 11 to 13 irradiates the paper sheet 100 with a light, the line sensor 4 receives the reflected light reflected by the paper sheet 100 or the transmitted light that has passed through the paper sheet 100 by using an imaging device, such as, a CCD, and captures the image of the paper sheet 100. When capturing the image of the paper sheet 100, the reflected light and the transmitted light received from the paper sheet 100 are guided to the line sensor 4 by the optical system 5 that includes an SLA, etc. Furthermore, the line sensor 4 has a resolution such that when the image of the paper sheet 100 having the motion thread is captured, a clear image of the pattern on the motion thread is captured in the paper sheet image.

The imaging device used in the line sensor 4 can be a photodiode array, a CMOS, etc., so long as it can capture the image of the paper sheet 100. A sensor type is also not limited to the line sensor 4, and other sensors, such as, an area sensor, can also be used. A different lens array can be used in the optical system 5, or the paper sheet recognition apparatus 1 can be devoid of the optical system 5 so long as the sensor is capable of capturing a clear image.

The first light source 11 and the second light source 12 are arranged such that the light is irradiated from different directions towards the paper sheet 100 that is being transported. As the first light source 11 and the second light source 12, a linear light source that can irradiate a linear light by using, for example, an LED array, a light guide, etc., is used. The lights irradiated from the first light source 11 and the second light source 12 are reflected by the surface of the paper sheet 100, and received by the line sensor 4 via the optical system 5. The first light source 11 and the second light source 12 are arranged by adjusting the positions thereof such that, when reflection images of the paper sheet 100 captured by using the line sensor 4 under the two light sources are compared, the images of the motion thread part are different. The light sources 11 and 12 presented in FIG. 1 are merely the examples and the number of the light sources for obtaining the reflection images is not limited to two. For example, more than two light sources can also be arranged.

Specifically, in FIG. 1, the light sources 11 and 12 are arranged by adjusting the positions thereof so as to correspond with two positions such that, when the position of the light source irradiating the paper sheet 100 with the light from above (+Z-axis direction) is moved while viewing the motion thread on the paper sheet 100 from the position of the line sensor 4, the same pattern can be observed at different positions or different patterns can be observed, according to the type of the motion thread. Thus, when the paper sheet 100 is irradiated with the lights from the first light source 11 and the second light source 12, different images of the motion thread part are captured by the line sensor 4. In the present embodiment, whether the paper sheet 100 has the motion thread is judged based on the images captured by the line sensor 4; details thereof are described later.

Furthermore, a positional relation among the line sensor 4, the first light source 11, and the second light source 12 is suitably determined according to optical properties of the motion thread embedded in the paper sheet 100 to be processed. However, for example, as shown in FIG. 1, an angle a between the Z-axis and the line sensor 4 should preferably be within 15 degrees to 45 degrees, an angle β1 between the Z-axis and an optical axis of the first light source 11 should preferably be within 0 degrees to 30 degrees, and an angle β2 between the optical axis of the first light source 11 and an optical axis of the second light source 12 should preferably be within 60 degrees to 30 degrees depending on the angle β1. For example, a green visible light is used as the first light source 11 and the second light source 12. However, so long as the light enables capturing the pattern on the motion thread part as an image, there are no restrictions on the type, number, or wavelength of the light.

The third light source 13 is arranged at a position to face the line sensor 4, with the paper sheet 100 that is transported in the apparatus between the third light source 13 and the line sensor 4. The light of the third light source 13 is irradiated from a back side of the paper sheet 100 when viewed from the line sensor 4, passes through the paper sheet 100 and is received by the line sensor 4. That is, a transmitted image of the paper sheet 100 is captured by using the third light source 13. For example, an infrared light is used as the third light source 13 and the captured transmitted image is used for recognizing a position of the motion thread on the paper sheet 100.

If the position of the motion thread on the paper sheet 100 can be identified based on a reflection image obtained by using the first light source 11 or the second light source 12 or some other information, the paper sheet recognition apparatus 1 can be devoid of the third light source 13.

In FIG. 1, a case is explained as an example in which the motion thread is present on a surface of the paper sheet 100 on the +Z-axis direction side; however, the present embodiment is not limited to this. For example, when there is a likelihood that the paper sheet 100 that is transported in the paper sheet recognition apparatus 1 has the motion thread on a surface on a −Z-axis direction side, in addition to the structure shown in FIG. 1, a line sensor and two light sources corresponding to the first light source 11 and the second light source 12 can be arranged at symmetrical positions relative to the paper sheet 100, and an image of the surface of the paper sheet 100 on which the motion thread is present can be captured. Because in the field of banknote recognition devices, a technology in which light sources and line sensors are arranged on both sides of a banknote transport path for capturing an image of selected one surface or images of both surfaces of a banknote and recognizing a denomination, etc., of the banknote is a known technology, detailed explanation thereof is omitted. A case in which an image of one surface of the paper sheet 100 is captured, as shown in FIG. 1, is explained below.

It is not particularly limited as to a transport direction (X-axis direction) of the paper sheet 100 would be parallel to which one of a long side or a short side of the paper sheet 100. For example, according to optical properties of a micro-lens, etc., that forms the motion thread, if the pattern appeared on the motion thread part varies by transporting the paper sheet 100 parallel to the short side, the paper sheet is transported parallel to the short side; if the pattern appeared on the motion thread part varies by transporting the paper sheet 100 parallel to the long side, the paper sheet 100 is transported parallel to the long side. A transport method of the paper sheet 100, including a transport direction, a transport speed, etc., is suitably decided, according to the property of the motion thread, so that the presence or absence of the motion thread can be detected by a method described later.

Figure 2:
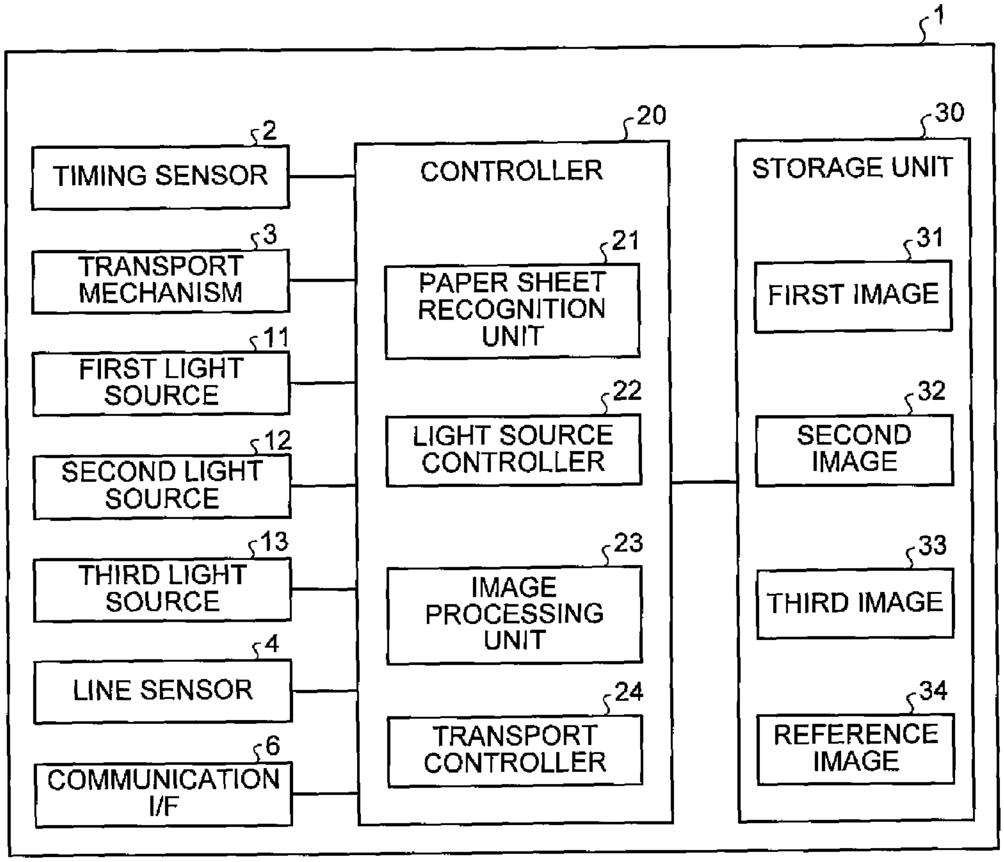
FIG. 2 is a functional block diagram of the paper sheet recognition apparatus according to the first embodiment.

FIG. 2 is a functional block diagram of the paper sheet recognition apparatus 1. Other than functional units shown in FIG. 1, the paper sheet recognition apparatus 1 includes a communication interface 6 (hereinafter, "Communication I/F"), a controller 20, and a storage unit 30. The controller 20 includes a paper sheet recognition unit 21 that performs recognition of a type, etc., of the paper sheet 100 and judges the presence or absence of the motion thread, a light source controller 22 that controls each of the light sources 11 to 13, an image processing unit 23 that captures an image of the paper sheet 100 and performs image processing of the captured image, and a transport controller 24 that controls the transport mechanism of the rollers 3, etc., that transport the paper sheet 100. The storage unit 30 stores therein a first image 31 that is a reflection image of the paper sheet 100 captured by irradiation of the light from the first light source 11, a second image 32 that is a reflection image of the paper sheet 100 captured by irradiation of the light from the second light source, a third image that is a transmitted image of the paper sheet 100 captured by irradiation of the light from the third light source, and various reference images 34 used for performing a judgment process, etc., of all portions or a characterizing portion of the captured images 31 to 33 of the paper sheet 100. Furthermore, the storage unit 30 stores therein information relating to the images 31 to 34 mentioned above.

The paper sheet recognition unit 21 has a function of identifying a type, etc., of the paper sheet 100 by comparing the captured third image 33 of the paper sheet 100 with the reference images 34 relating to various paper sheets 100 to be processed. Meanwhile, the reference images 34 are previously stored in the storage unit 30.

Specifically, for example, if processing target banknotes are US dollar banknotes, the reference images 34 of various banknotes such as USD 1, USD 2, USD 5, USD 10, USD 20, USD 50, and USD 100 are previously stored in the storage unit 30. Furthermore, the characterizing portion of the captured image of the paper sheet 100 that is being processed is compared with each of the reference images 34. Consequently, the paper sheet 100 is judged to be a banknote of USD 100 if the captured image of the paper sheet 100 matches with the reference image 34 of the banknote of USD 100 within a predetermined range and differs from the reference images 34 of other denominations exceeding a predetermined range. If the processing target paper sheet 100 is a banknote, the paper sheet recognition unit 21 also performs, apart from performing denomination recognition as mentioned above, authenticity recognition for judging whether the banknote is a genuine note, fitness recognition for judging whether the banknote satisfies predetermined standards and is suitable for further circulation, etc. Because in the field of the banknote recognition devices these recognition processes are known; the detailed explanations thereof are omitted.

The paper sheet recognition unit 21 also judges whether the paper sheet 100 has the motion thread. The paper sheet recognition unit 21 judges whether the paper sheet 100 has the motion thread based on the captured first image 31 and second image 32 of the paper sheet 100; this is explained in detail later.

The light source controller 22 controls lighting of the first light source 11, the second light source 12, and the third light source 13. The light source controller 22 exerts alternating lighting control that causes each of the light sources 11 to 13 to light up sequentially for capturing the paper sheet images separately by using each of the light sources 11 to 13; this is explained in detail later.

The image processing unit 23 processes output signals outputted from the line sensor 4 in synchronization with the timing at which each of the light sources 11 to 13 controlled by the light source controller 22 is lit up, and storing the first image 31, the second image 32, and the third image 33 in the storage unit 30. Furthermore, the image processing unit 23 also performs image processing of images 31 to 33 based on the process performed by the paper sheet recognition unit 21; this is explained in detail later.

The storage unit 30 includes storage devices, such as, a volatile memory, a non-volatile memory, or a hard disk, and is used for storing various data necessary for the processes performed by the paper sheet recognition apparatus 1.

The communication I/F 6 has a function of receiving signals from outside of the paper sheet recognition apparatus 1 and transmitting signals to outside of the paper sheet recognition apparatus 1. Upon receiving the signals from outside, the communication I/F 6 changes operation settings of the controller 20, performs processes such as update, addition, and deletion of software programs and data stored in the storage unit 30, and outputs judgment results of the paper sheet 100 obtained by the paper sheet recognition apparatus 1 to the outside.

The controller 20 is configured by, for example, a software program for implementing various processes, a CPU for executing the software program, various hardware controlled by the CPU, etc. For storing a software program or data required for an operation of each component, the storage unit 30, a dedicated memory, such as, a RAM, a ROM, the hard disk, etc., can be used.

Figure 3A:
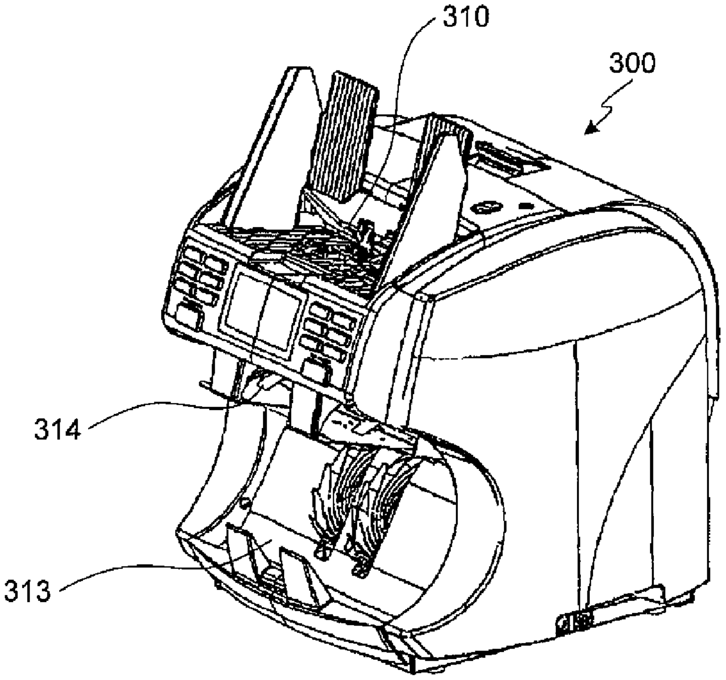
FIGS. 3A and 3B are, respectively, a perspective view and a cross-sectional schematic view of a paper sheet processing apparatus in which the paper sheet recognition apparatus according to the first embodiment is used.
Figure 3B:
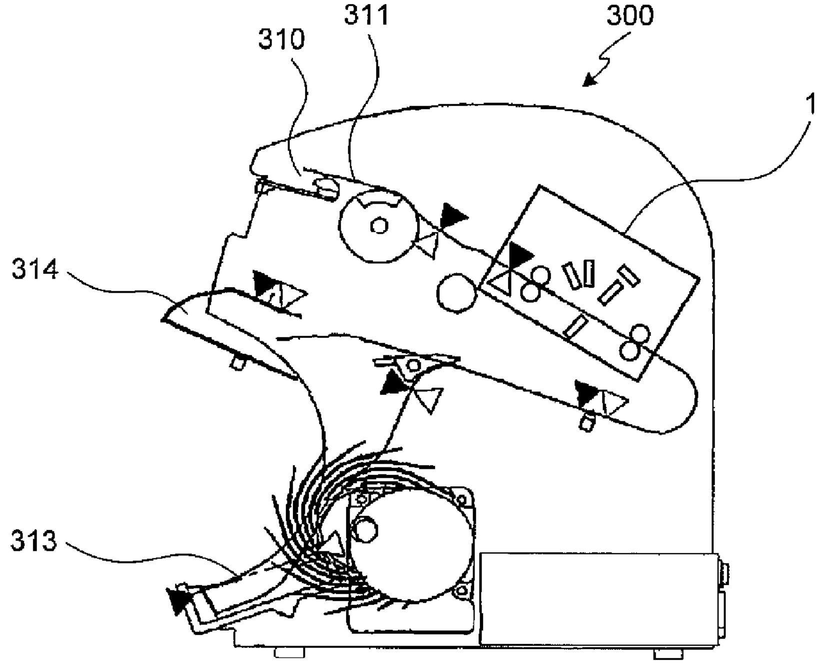

In the present embodiment, functions and operations of a stand-alone paper sheet recognition apparatus 1 are explained; however, for example, the paper sheet recognition apparatus 1 is, as a device, incorporated into a paper sheet handling apparatus 300 and used as shown in FIGS. 3A and 3B. FIG. 3A is an external view of the paper sheet handling apparatus 300 and FIG. 3B is a cross-sectional view showing an overview of an internal structure of the paper sheet handling apparatus 300 that includes the paper sheet recognition apparatus 1.

The paper sheet processing apparatus 300 includes, a hopper 310 in which a plurality of paper sheets 100 can be placed, a transport path 311 to transport the banknotes placed in the hopper 310, the paper sheet recognition apparatus 1 that performs a recognition process on the paper sheet 100, a stacking unit 313 to stack the paper sheet 100 recognized by the paper sheet recognition apparatus 1, and a reject unit 314 to stack, separately from other paper sheets 100, the paper sheet 100 that has failed to be recognized and the paper sheet 100 that satisfies predetermined conditions. By incorporating the paper sheet recognition apparatus 1 in such a paper sheet processing apparatus 300, the paper sheets 100 placed in the hopper 310 can be processed one-by-one in a continuous manner.

The paper sheet recognition apparatus 1 can also include sensors other than the line sensor 4 according to the type of the recognition process to be performed on the paper sheet 100 to be processed. Specifically, the paper sheet recognition apparatus 1 can also include, for example, a magnetic sensor (s) that measures magnetic properties of the paper sheet 100, and rollers that measure a thickness of the paper sheet 100. The paper sheet recognition apparatus 1 can also include multiple light sources and multiple line sensors for measuring optical properties of the paper sheet by irradiation of multiple types of lights, such as, infrared light, ultraviolet light, and visible light. Because these are known technologies in the field of the banknote processing devices, the detailed explanations thereof are omitted.

A process performed by the paper sheet recognition apparatus 1 for judging the presence or absence of the motion thread on the paper sheet 100 is explained below.

Figure 4:
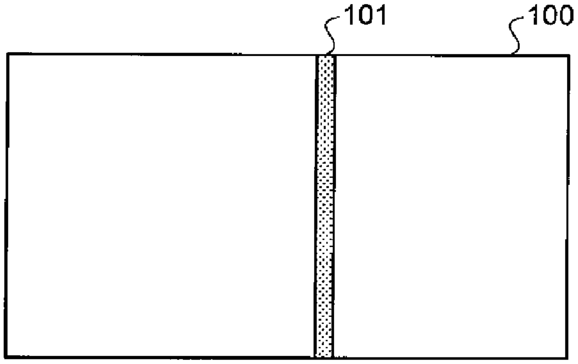
FIG. 4 is a schematic diagram showing an example of a paper sheet that includes a motion thread according to the first embodiment.

The paper sheet 100 used in the following explanation and the motion thread embedded in the paper sheet 100 are explained first. FIG. 4 is a schematic diagram showing an example of the paper sheet 100 in which a motion thread 101 is embedded at a predetermined position on one surface of the paper sheet 100. Various types of threads are used in the paper sheet 100; however, the motion thread 101 is a special type of thread on which a position of the pattern is observed as if it is shifted and the pattern is observed as if it is changed to a different pattern according to a position of the light source.

Figures 5A, 5B, 5C:
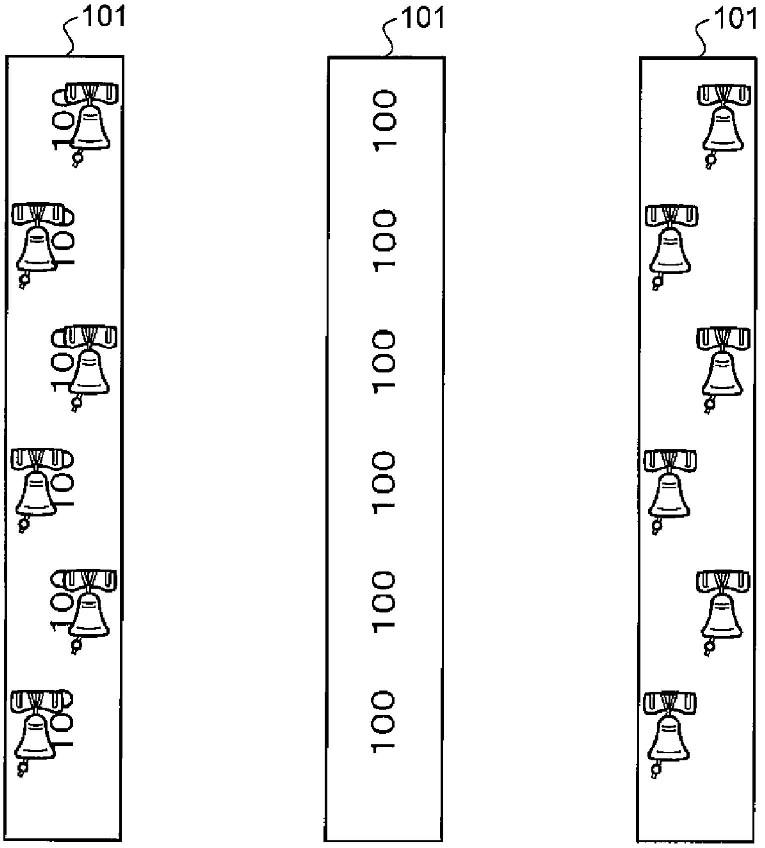
FIGS. 5A to 5C are drawings showing examples of patterns appeared in a motion thread part when the paper sheet according to the first embodiment is titled.

When the positions of the light sources that irradiate the paper sheet 100 with the light are shifted, variation in the pattern observed on the motion thread 101 part differs according to the optical properties, etc., of icons and the micro-lens forming the motion thread 101. In the present embodiment, as shown in FIG. 5A, two types of icons such as a bell design and a numeral "100" are printed on the motion thread 101. When the light is irradiated from a predetermined angle (first direction), only the numeral "100" can be observed as shown in FIG. 5B and when the light is irradiated from a predetermined angle (second direction) that is different from the first direction, only the bell design can be observed as shown in FIG. 5C is explained below.

In the paper sheet recognition apparatus 1, the position of the line sensor 4 and the position of the first light source 11 relative to the line sensor 4 are adjusted such that the image of the motion thread 101, which is captured by the line sensor 4 by irradiation of the light from the first light source 11, includes only the numeral "100" as shown in FIG. 5B. Moreover, the position of the second light source 12 relative to the line sensor 4 is adjusted such that the image of the motion thread 101 captured by the line sensor 4 by irradiation of the light from the second light source 12 includes only the bell design as shown in FIG. 5C. That is, the angles $\alpha$, $\beta 1$, and $\beta 2$ shown in FIG. 1 are adjusted such that a different image of the motion thread 101 is captured by each of the light sources 11 and 12.

Figure 6:
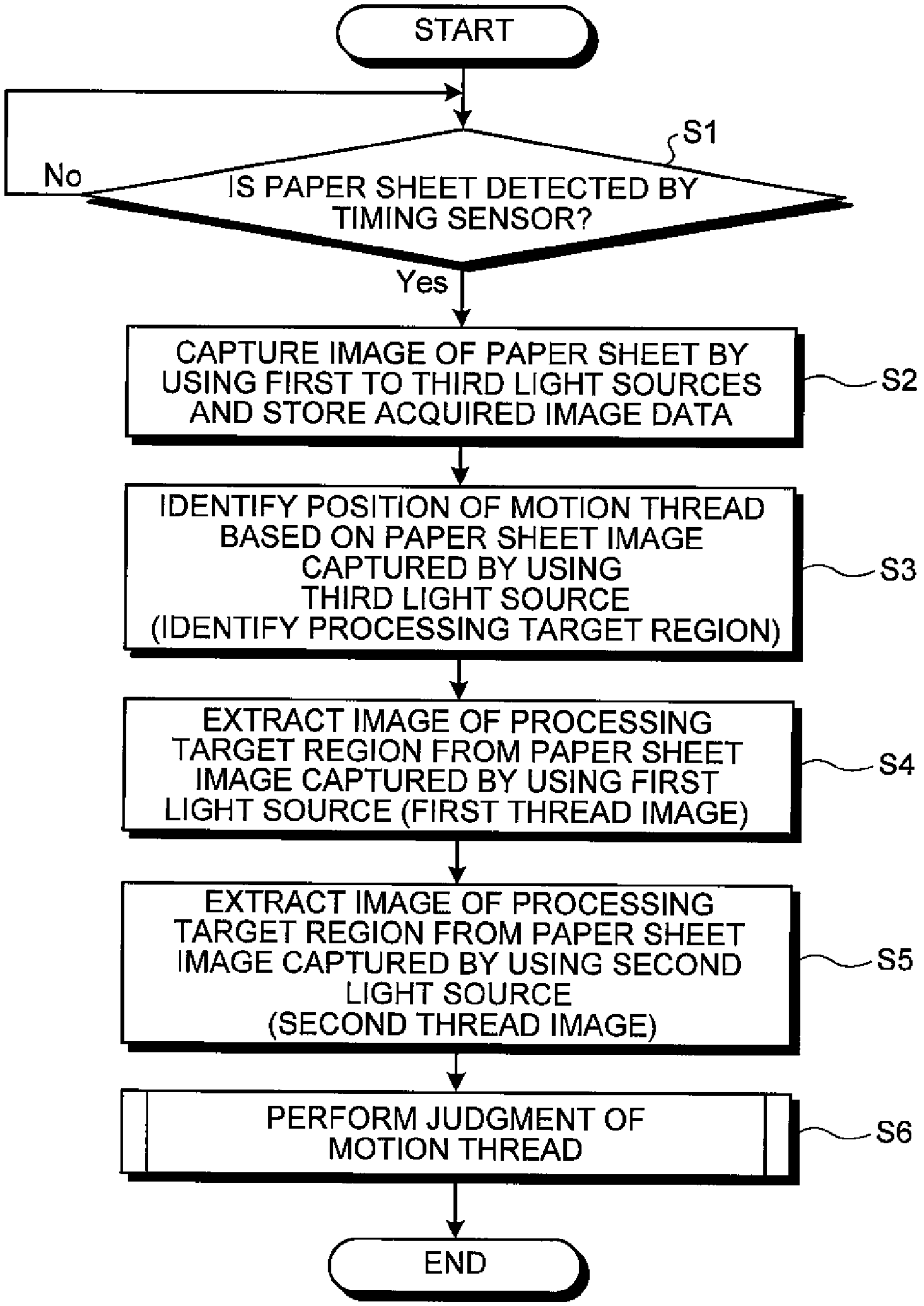
FIG. 6 is a flowchart for explaining a judgment process of the motion thread performed by the paper sheet recognition apparatus according to the first embodiment.

A process for judging whether the paper sheet 100 has the motion thread 101 is explained below. FIG. 6 is a flowchart explaining an overview of a judgment process relating to the motion thread 101.

If the timing sensor 2 detects the arrival of the paper sheet 100 in the paper sheet recognition apparatus 1 (Yes at Step S1), the controller 20 causes the light source controller 22 to control lighting of each of the light sources 11 to 13, and causes the image processing unit 23 to capture images of the paper sheet 100 and to store the captured images in the storage unit 30 (Step S2). During a period in which the paper sheet 100 is not detected (No at Step S1), the paper sheet recognition apparatus 1 monitors the arrival of the paper sheet 100.

At step S2, during one transportation cycle when the paper sheet 100 passes below the line sensor 4, three types of images, namely, the reflection images by each of the first light source 11 and the second light source 12, and the transmitted image by the third light source 13, are acquired.

Figure 7:
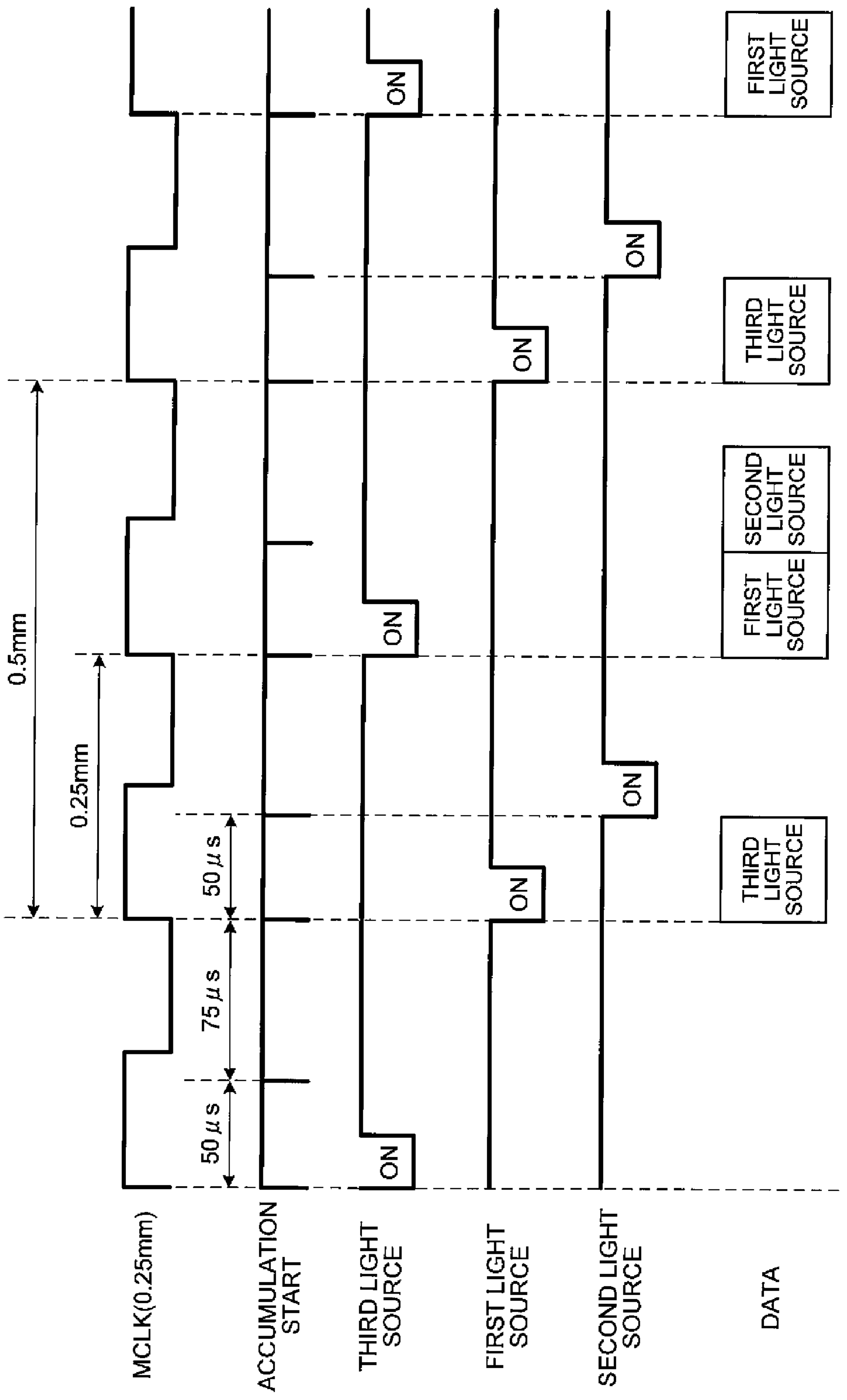
FIG. 7 is a time chart showing alternating lighting control of a plurality of light sources according to the first embodiment.

The alternating lighting control performed by the light source controller 22 and processing of data, which is outputted from the line sensor 4, performed by the image processing unit 23 for capturing the images of the paper sheet 100 separately by using each of the light sources 11 to 13 are explained below. FIG. 7 is a time chart showing a relation between lighting of each of the light sources 11 to 13 and processing of data outputted from the line sensor 4. In FIG. 7, a case is explained as an example in which a read cycle performed by the line sensor 4 is 50 microseconds (μS) and a transportation speed of the paper sheet 100 is 2,000 mm/S. As shown in FIG. 7, each of the light sources 11 to 13 is controlled so as to emit a light at different timings.

Specifically, the third light source 13 emits the light at the rising time of a machine clock signal (MCLK) that is used in the operation of the controller 20 and that is synchronous to the transportation of the paper sheet 100, and the transmitted light that passes through the paper sheet 100 is measured by the line sensor 4. The signal measured by the line sensor 4 is inputted into the image processing unit 23. Thereafter, by the image processing unit 23, data is subjected to the A/D conversion process, etc., and stored in the storage unit 30 as data forming the third image 33 at the rising time of the next clock signal.

The first light source 11 emits the light and the line sensor 4 receives a reflected light from the paper sheet 100 at the same timing of storing the data of the third image 33 in the storage unit 30. Similarly, the signal measured by the line sensor 4 is subjected to processing by the image processing unit 23, and stored in the storage unit 30 as the data forming the first image 31 at the rising time of the next clock signal. At the rising time of the next clock signal, the third light source 13 emits the light again.

After the first light source 11 has emitted the light, the second light source 12 emits the light during a predetermined timing that is before the light is emitted by the third light source 13, and similarly, the reflected light from the paper sheet 100 is measured by the line sensor 4. For example, as shown in FIG. 7, the second light source 12 emits the light at a timing after 50 μS from rising of the clock signal. The signal measured by the line sensor 4 after the light is emitted by the second light source 12 is subjected to processing by the image processing unit 23, and stored in the storage unit 30 as data forming the second image 32 after data processing relating to the first image 31 has ended.

In this manner, each of the light sources 11 to 13 is controlled so as to emit the light at different timings. The signals measured by the line sensor 4 by using each of the light sources 11 to 13 are sequentially stored in the storage unit 30. As a result, during one passage of the paper sheet 100 below the line sensor 4, the respective images of the entire surface of the paper sheet 100 are captured under each of the light sources 11 to 13, and the first image 31, the second image 32, and the third image 33 are stored in the storage unit 30.

The alternating lighting control explained in FIG. 7 is merely an example. A light emission timing sequence and a data processing sequence of each of the light sources 11 to 13 are not particularly limited so long as the reflection images of the paper sheet 100 can be separately captured by using the first light source 11 and the second light source 12. For example, when images of the paper sheet 100 are to be captured by using four or more light sources for recognizing the paper sheet 100, the light emission timings of the light sources and the data processing timing are suitably decided according to the number of the light sources and a processing speed, etc., of the line sensor 4. Also, for example, when high-speed processing of the paper sheet 100 is not required, instead of alternating the lighting, the paper sheet 100 can be transported to the +X-axis direction and the reflection image thereof can be captured by using the first light source 11 during the +X-axis direction transport, and thereafter, the paper sheet can be again transported to the --X-axis direction and the reflection image thereof can be captured by using the second light source 12 during the −X-axis direction. It is preferable that the images 31 to 33 be images obtained by capturing the entire surface of the paper sheet 100 so that these images can be used in other recognition processes performed based on the paper sheet images. However, the present embodiment is not limited to this; an image obtained by capturing only a partial region in which the motion thread 101 is present can be used.

When the captured images 31 to 33 of the paper sheet 100 are stored in the storage unit 30 in this manner, a position of the motion thread 101 is identified based on the third image 33 (Step S3 of FIG. 6).

Specifically, the paper sheet recognition unit 21 compares the third image 33 and the reference images 34 previously stored in the storage unit 30, recognizes the type of the paper sheet 100 as well as the position of the motion thread 101 on the first image 31 and the second image 32 according to the type of the paper sheet 100. When a processing target banknote is the US dollar banknote and if a denomination of the paper sheet 100 is recognized as a banknote of USD 100, then based on position information of the motion thread 101 on the banknote of USD 100, processing target regions on the first image 31 and the second image 32 are identified. The position information of the motion thread 101 is previously stored in the storage unit 30 as information relating to the reference images 34 of the banknote of USD 100.

The method of identifying the position of the motion thread 101 is not limited to the method in which the type of the paper sheet 100 is recognized. Instead, a method, in which the third image 33 that is the transmitted image of the paper sheet 100 is used, can be employed. Specifically, when a region of the motion thread 101 embedded in the paper sheet 100 appears as bright or dark on the transmitted image so that it can be discriminated from other regions, image processing in which the partial region of the motion thread 101 is extracted based on pixel values can be performed.

An example is presented in which the position of the motion thread 101 is identified based on the transmitted image captured by using the third light source 13; however, the present embodiment is not limited to the case presented in this example. Specifically, the reflection image of the paper sheet 100 captured by using the first light source 11 or the second light source 12 can be used to recognize the type of the paper sheet 100 and to identify the position of the motion thread 101. Also, the position of the motion thread 101 can be identified based on a difference between the pixel values of the motion thread 101 and those of the other region in the reflection image captured by using the first light source 11 or the second light source 12.

When a region corresponding to the motion thread 101 is identified in the first image 31 and the second image 32, the image processing unit 23 extracts a partial region image (hereinafter, "first thread image") corresponding to the motion thread 101 from the first image 31 (Step S4 of FIG. 6). Similarly, the image processing unit 23 extracts a partial region image (hereinafter, "second thread image") corresponding to the motion thread 101 from the second image 32 (Step SS).

Specifically, a partial region image that includes the motion thread 101 of which position is identified is extracted from the captured image of the entire paper sheet 100 shown in FIG. 4 and the captured first thread image of the motion thread 101 as shown in FIG. 5B and the captured second thread image of the same motion thread 101 as shown in FIG. 5C are obtained. Based on the first thread image and the second thread image thus obtained, the process of judging whether the paper sheet 100 has the motion thread 101 is performed (Step S6).

Figure 8:
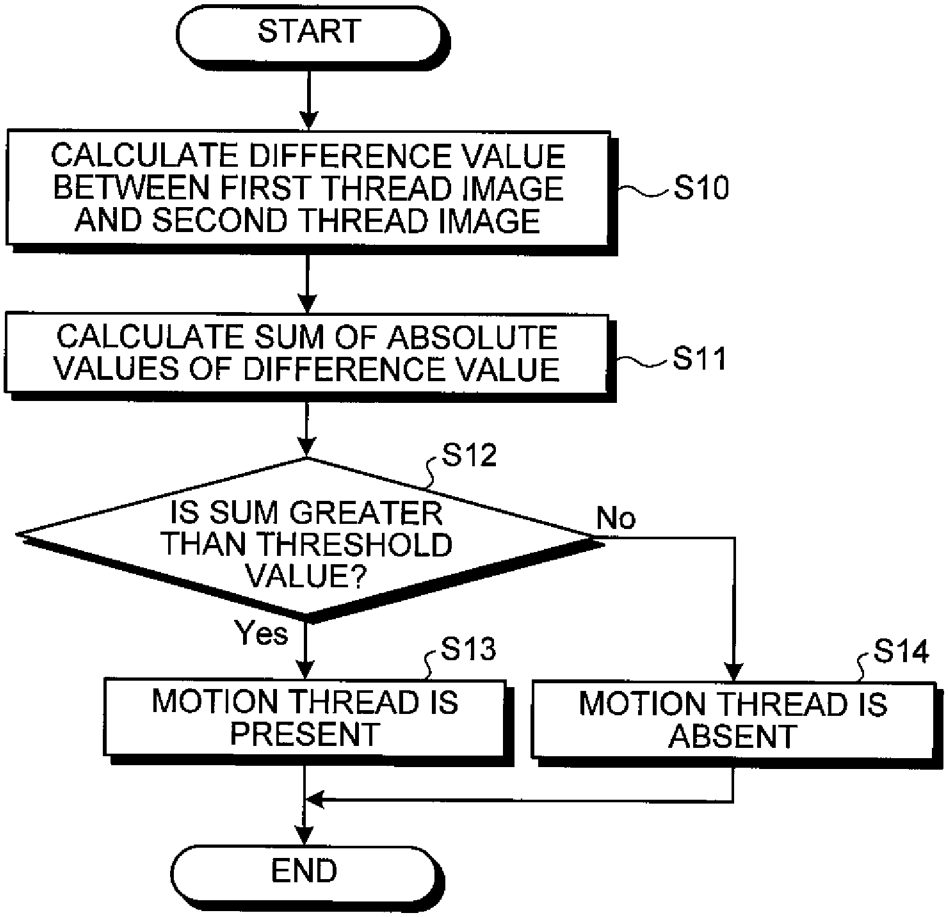
FIG. 8 is a flowchart for explaining a method of judging the presence or absence of the motion thread according to the first embodiment by calculating a difference between images.

A method of judging the presence or absence of the motion thread 101 based on the first thread image and the second thread image is explained below. In the present embodiment, each of the first thread image and the second thread image has different patterns, and by calculating a difference between the images, the presence or absence of the motion thread 101 is judged. FIG. 8 is a flowchart for explaining the judgment method. The paper sheet recognition unit 21 calculates the difference between the first thread image and the second thread image (Step S10). That is, the paper sheet recognition unit 21 calculates a difference between the pixel values at corresponding pixel positions on the two images.

The paper sheet image captured by the line sensor 4 is a density image in which each pixel forms the image gradation. Therefore, the first thread image and the second thread image extracted from the paper sheet image are also density images. When performing a process of calculating the difference (Step S10), the first thread image and the second thread image can be used as the density images. Alternatively, after an imaging process is performed to binarize the images, the binary images can be used in the subsequent processes.

Figure 9A:
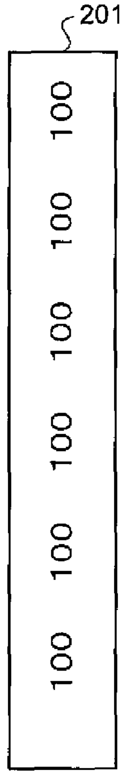
FIGS. 9A to 9D are drawings for explaining a method of calculating the difference between the images of the motion thread part according to the first embodiment.
Figure 9B:
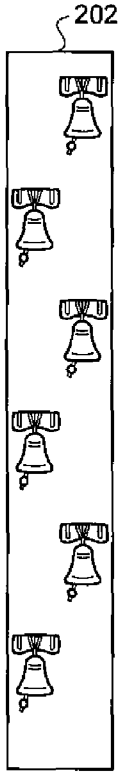
Figure 9C:
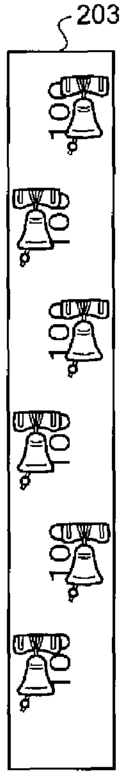

If the paper sheet 100 has the motion thread 101, the first thread image will be an image 201 that includes only the numeral "100" as shown in FIG. 9A and the second thread image will be an image 202 that includes only the bell design as shown in FIG. 9B. Therefore, when the difference between the pixel values at each pixel position of the first thread image 201 and the second thread image 202 is calculated and an absolute value thereof is obtained, an image 203 shown in FIG. 9C is obtained as a calculation result.

Even if the paper sheet 100 having the motion thread 101 embedded therein is counterfeited, the motion thread 101 that uses the micro-lens, such as, a lenticular lens cannot be counterfeited easily. Thus, in the counterfeit paper sheet, any one pattern from the two types of patterns or both patterns observed on the motion thread 101 section are reproduced at the position of the motion thread 101 on the paper sheet 100 shown in FIG. 4. In this case, even if the counterfeit paper sheet is tilted, always only one of the patterns shown in FIGS. 5A to 5C can be observed. That is, the pattern on the motion thread 101 does not vary even when the paper sheet 100 is tilted. Another outcome apart from the pattern not varying when the paper sheet 100 is tilted is that there is a likelihood that the pattern is not completely created within the motion thread 101 section of the counterfeit paper sheet.

Figure 9D:
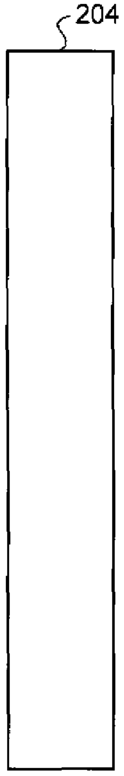

In either case, in the counterfeit paper sheet, the first thread image captured by using the first light source 11 and the second thread image captured by using the second light source 12 are the same images. Therefore, in the counterfeit paper sheet, when differences of pixel values between the first thread image and the second thread image are calculated, the differences of pixel values are substantially zero. As a result, an image 204 shown in FIG. 9D is obtained as a calculation result.

Thereafter, the paper sheet recognition unit 21 calculates a sum of absolute values of the difference between the first thread image 201 and the second thread image 202 (Step S11 of FIG. 8). In the paper sheet 100 that includes the motion thread 101, the value calculated above is the sum of the pixel values of the image 203 shown in FIG. 9C; however, in the counterfeit paper sheet, because the sum of the pixel values of the image 204 shown in FIG. 9D is substantially zero, the calculated value is substantially zero.

However, in actuality, there is a likelihood of a noise, etc., being included even in the counterfeit paper sheet owing to image capturing conditions, giving rise to a difference between the first thread image and the second thread image. Therefore, a predetermined threshold value is previously set based on the sum calculated at Step S11 for the paper sheet 100 having the motion thread 101. Thus, even if the difference arises owing to the noise in the calculation process of the counterfeit paper sheet, the counterfeit paper sheet and the paper sheet 100 having the motion thread 101 can be clearly discriminated by using the set threshold value, without the difference due to the noise affecting the process.

The paper sheet recognition unit 21 compares the threshold value and the calculated sum of the pixel values of the difference image 203 of the first thread image 201 and the second thread image 202, and judges whether the sum is greater than the threshold value (Step S12 of FIG. 8). If the obtained sum is greater than the threshold value (Yes at Step S12), the paper sheet recognition unit 21 judges that the motion thread 101 is present in the paper sheet 100 (Step S13). However, if the sum is less than or equal to the threshold value (No at Step S12), the paper sheet recognition unit 21 judges that the motion thread 101 is absent in the paper sheet 100 (Step S14).

The judgment result indicating the presence or absence of the motion thread 101 obtained in this manner is used as one of the judgment conditions of authenticity recognition of the paper sheet 100 in the paper sheet recognition apparatus 1. The judgment result is outputted to the outside through the communication I/F 6, and used in processes performed by an external device.

The first light source 11, the second light source 12, and the line sensor 4 are arranged such that different images of the motion thread 101 are captured. Therefore, based on the difference between the images of the motion thread 101 obtained by using each of the light sources 11 and 12, it can be judged accurately whether the paper sheet 100 has the motion thread 101.

In the calculation that is performed for the judgment of the presence or absence of the motion thread 101, only the partial region image of the motion thread 101 is targeted for processing instead of targeting the entire paper sheet 100 for processing, the difference between the pixel values of each pixel of the two images is calculated, and the sum of the absolute values of the difference is compared with the threshold value. Therefore, a processing load is reduced and processing can be performed at high speed.

Because the presence or absence of the motion thread 101 can be judged by using a single line sensor 4 based on the property of the motion thread 101 that the image of the motion thread 101 varies according to the viewing position, a compact and low-cost paper sheet recognition apparatus 1 can be realized as compared to when a plurality of sensors are used.

Second Embodiment

In the first embodiment, the presence or absence of the motion thread is judged based on the calculation of the difference of pixel values between the first thread image and the second thread image. A second embodiment of the present invention differs from the first embodiment in that the presence or absence of the motion thread 101 is judged based on a predetermined pattern included in each of the first thread image and the second thread image.

In the present embodiment, the processes performed before obtaining the first thread image and the second thread image are similar to those of the first embodiment; therefore, the explanation thereof is omitted. A judgment process of the motion thread 101 (Step S6 of FIG. 6) that differs from that of the first embodiment is explained below.

Figure 10:
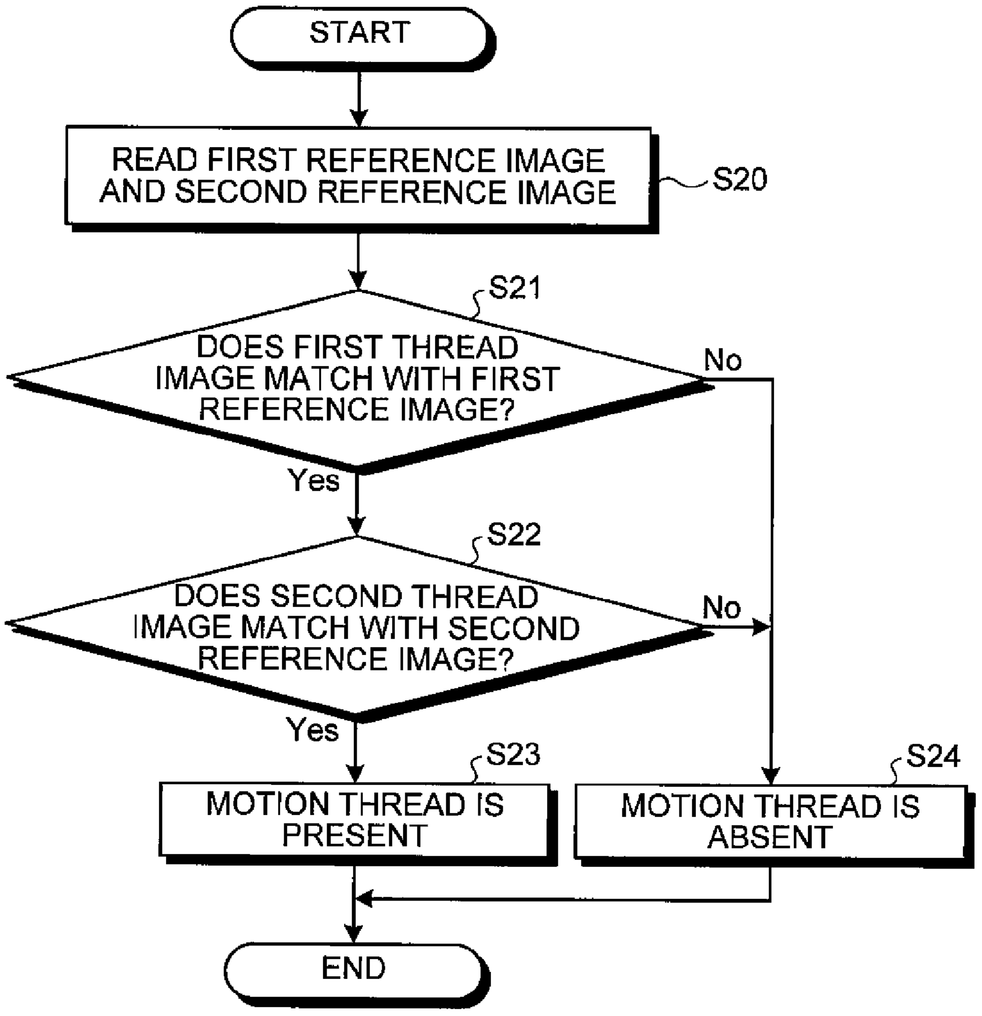
FIG. 10 is a flowchart for explaining a method of judging the presence or absence of a motion thread according to a second embodiment of the present invention by comparing images of the motion thread and a reference image.

FIG. 10 is a flowchart for explaining a method of judging the presence or absence of the motion thread 101 according to the present embodiment. When the first thread image captured by using the first light source 11 and the second thread image captured by using the second light source 12 are obtained, the paper sheet recognition unit 21 reads a first reference image and a second reference image that are stored in the storage unit 30 as the reference images 34 (Step S20).

The first reference image is a reference image that corresponds to the first thread image obtained by capturing the image of the motion thread 101 by using the first light source 11. By comparing the first thread image and the first reference image, it can be judged whether the first thread image is an image of the motion thread 101. Similarly, the second reference image is a reference image that corresponds to the second thread image obtained by capturing the image of the motion thread 101 by using the second light source 12. By comparing the second reference image and the second thread image, it can be judged whether the second thread image is an image of the motion thread 101 captured by using the second light source 12.

The paper sheet recognition unit 21 compares the first thread image and the first reference image and judges whether the two images match (Step S21). If the two images match, the judgment is made that the first thread image is the image of the motion thread 101 that is captured by using the first light source 11, and the process control shifts to the next process (Yes at Step S21).

However, if the first thread image and the first reference image do not match, the judgment is made that the first thread image is not the image of the motion thread 101 captured by using the first light source 11 (No at Step S21). Consequently, the judgment is made conclusively that the motion thread 101 is absent in the paper sheet 100 (Step S24).

Thereafter, the paper sheet recognition unit 21 compares the second thread image and the second reference image and judges whether the two images match (Step S22). If the two images match, the judgment is made that the second thread image is the image of the motion thread 101 captured by using the second light source 12 (Yes at Step S22). Consequently, the judgment is made conclusively that the motion thread 101 is present in the paper sheet 100 (Step S23).

However, if the second thread image and the second reference image do not match, the judgment is made that the second thread image is not the image of the motion thread 101 captured by using the second light source 12 (No at Step S22). Consequently, the judgment is made conclusively that the motion thread 101 is absent in the paper sheet 100 (Step S24).

As shown in FIGS. 9A and 9B, the first thread image 201 and the second thread image 202 of the motion thread 101 are different images. Therefore, the reference images corresponding to the first thread image 201 and the second thread image 202 are also the different images. In contrast, the first thread image and the second thread image will be identical if the motion thread 101 is counterfeit. Therefore, by comparing the first thread image 201 and the second thread image 202 with the respective corresponding reference images as shown in FIG. 10, it can be judged accurately whether the paper sheet 100 has the motion thread 101.

The paper sheet recognition unit 21 can accurately judge the presence or absence of the motion thread 101 even when there is a likelihood of shifting of the position of the pattern forming the thread image. Specifically, for example, when there are variations in the positions of the icons forming the motion thread 101 and the optical properties of the micro-lens according to the paper sheet 100, the position of the numeral "100" on the first thread image 201 shown in FIG. 9A or the bell design shown in FIG. 9B captured with such variations varies. As a result, although the captured thread images are the images of the actual motion thread 101, the judgment is likely to be made that these thread images do not match with the reference images. When the thread images and the reference images are compared (Steps S21 and S22 of FIG. 10), after judging that the thread images do not match with the reference images, the paper sheet recognition unit 21 judges whether the reference images and the thread images match by shifting the position of the pattern on the reference image or the thread image. If the reference images and the thread images match upon shifting of any one of the reference images and the thread images, the judgment is made that the thread image is the captured image of the motion thread 101 (Yes at Steps S21 and S22). If the reference images and the thread images do not match even if the reference images or the thread images are shifted, the judgment is made that the thread image is not the captured image of the motion thread 101 (No at Steps S21 and S22). Consequently, even if the position of the icons on the embedded motion thread 101 varies according to the paper sheet 100, the judgment that the paper sheet 100 has the motion thread can be made accurately.

A shift amount and a shift direction of the reference image or the thread image are set according to the actual variation of the motion thread 101. The paper sheet recognition unit 21 shifts the reference image or the thread image within a range of a setting value and performs judgment. The setting value used in the judgment is stored in the storage unit 30 as the information relating to the reference images 34.

The shift amount and the shift direction used in a first judgment process (Step S21) can be used in the second judgment process (Step S22). Specifically, in the motion thread 101 that includes two types of icons, even if there are variations in the positions of the icons, etc., a positional relation between the two types of icons is always constant. That is, the shift amount and the shift direction of the numeral "100" shown in FIG. 9A and the shift amount and the shift direction of the bell design shown in FIG. 9B are always the same. In this case, the shift amount and the shift direction which are used for the judgment for the first thread image 201 to judge that the first thread image 201 and the first reference image match (Step S21 of FIG. 10) are used in the judgment of the second thread image (Step S22). Thus, because the process for deciding the shift amount and the shift direction need not be repeated, a processing time can be reduced.

It can be set previously whether the judgment process is to be performed by shifting the thread image or the reference image according to the paper sheet 100 to be processed. This setting information is stored in the storage unit 30 as the information relating to the reference images 34. The paper sheet recognition unit 21 refers to the information relating to the reference images 34 while performing the judgment process. If the setting is made for performing the judgment process by shifting the image, the judgment process is performed according to the setting. If the judgment process requires that the image not be shifted, the judgment process (Steps S21 and S22) ends without shifting the image. Thus, if there is no need to shift the pattern on the paper sheet 100 to be processed, the process that includes shifting can be omitted, and as a result, the processing time can be reduced.

Thus, the first light source 11 and the second light source 12 are arranged such that different images of the motion thread 101 are captured, the images of the motion thread 101 obtained by using each of the light sources 11 and 12 are compared with the previously stored reference images that correspond to the captured images of the motion thread 101, and as a result, it can be judged accurately whether the paper sheet 100 has the motion thread 101. Even if there are variations in the actual positions of the icons, etc., on the motion thread 101; therefore, there are variations in the obtained thread image according to the paper sheet 100, these variations are taken into account when performing the comparison, and as a result, it can be judged accurately whether the paper sheet 100 has the motion thread 101.

In the present embodiment, in addition to the judgment of whether the images of the motion thread 101 section vary similar to that in the first embodiment, the judgment is made whether each image matches with the reference image, and therefore, it can be judged more accurately whether the paper sheet 100 has the motion thread 101.

Because the presence or absence of the motion thread 101 can be judged by using one line sensor 4 based on the property of the motion thread 101 that the images of the motion thread 101 vary according to the viewing position, a compact and low-cost paper sheet recognition apparatus 1 can be realized as compared to when using a plurality of the sensors.

Third Embodiment

In the first and second embodiments, as shown in FIG. 9, a case in which the first thread image 201 captured by using the first light source 11 and the second thread image 202 captured by using the second light source 12 have different patterns is explained as an example. However, the patterns are not limited to this. For example, the judgment can be made accurately whether the paper sheet 100 has the motion thread 101, even if the motion thread 101 has only the bell design and the positions of the bells vary when the paper sheet 100 is tilted.

Figure 11A:
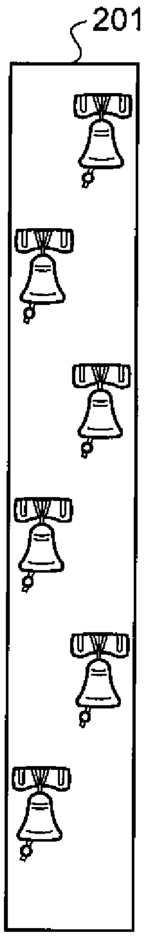
FIGS. 11A and 11B are drawings for explaining a method of comparing the images of the motion thread part and the reference image according to the second embodiment.
Figure 11B:
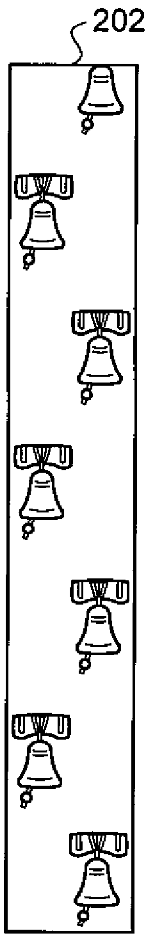

Specifically, for example, even in the case where, as shown in FIGS. 11A and 11B, the first thread image 201 shown in FIG. 11A and the second thread image 202 shown in FIG. 11B are the images in which the pattern is the same but the position of the pattern is shifted, the two images 201 and 202 are regarded as different. Therefore, it can be judged whether the paper sheet 100 has the motion thread 101 by the judgment methods explained in the first and second embodiments in which it is judged whether the two images 201 and 202 are different.

When the first thread image 201 shown in FIG. 11A and the second thread image 202 shown in FIG. 11B are images of the same pattern captured in different positions, the judgment is made that the two images are different, based on the calculation of the difference between the first thread image and the second thread image performed in the first embodiment. The present embodiment differs from the other embodiments in that, in addition to judgment methods adopted in the first and second embodiments, a method different from those adopted in the first and second embodiments is employed to verify whether the two images are different.

In the present embodiment, the processes performed for obtaining the first thread image 201 and the second thread image 202 are similar to those of the first embodiment. A judgment process of the motion thread 101 (Step S6 of FIG. 6) that differs from that of the first embodiment is explained below.

Figure 12:
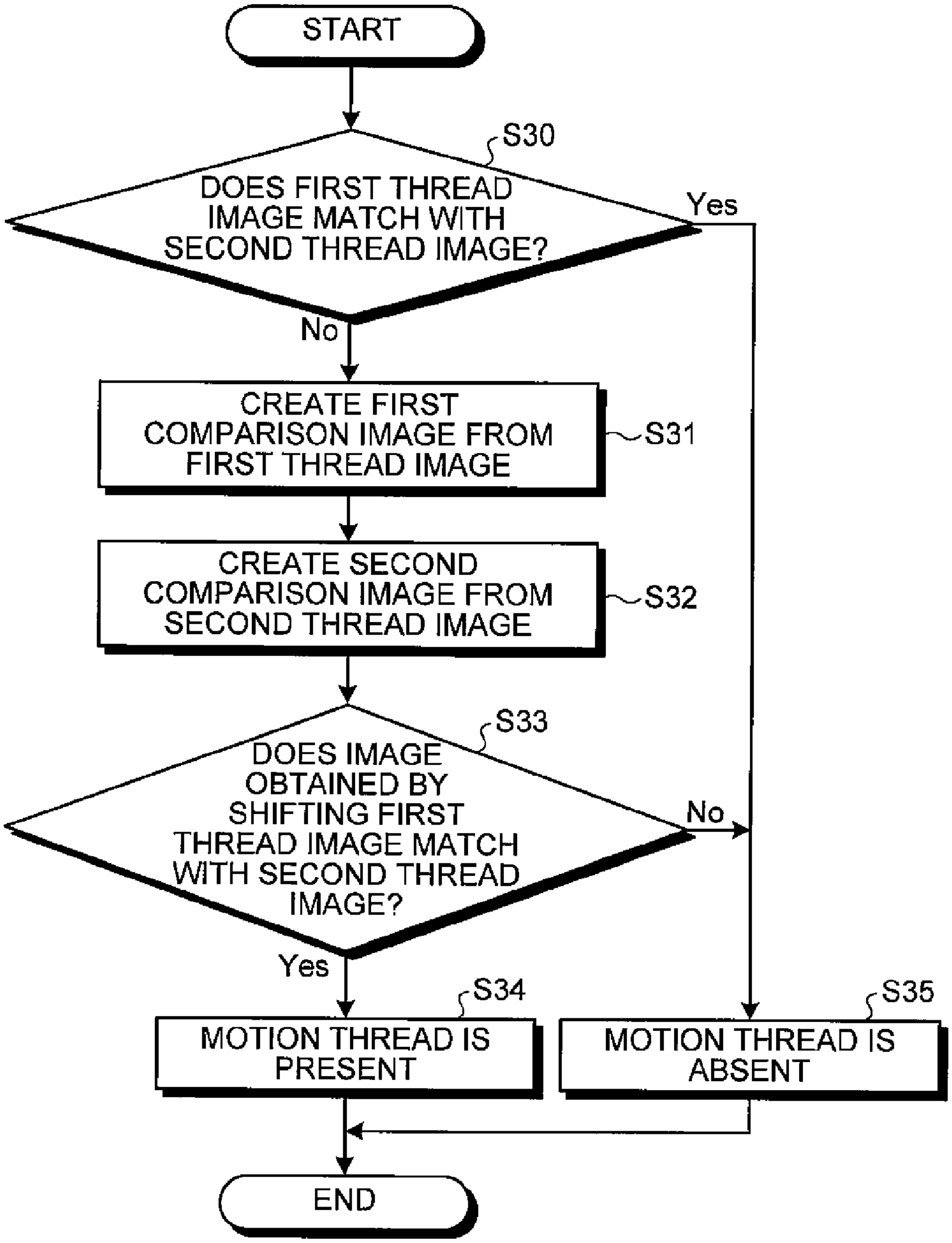
FIG. 12 is a flowchart for explaining a method of judging the presence or absence of a motion thread according to a third embodiment of the present invention in which one of the images of the motion thread is shifted and compared with the other image of the motion thread.

FIG. 12 is a flowchart of a third judgment method. Upon obtaining the first thread image 201 as shown in FIG. 11A and the second thread image 202 as shown in FIG. 11B by the same processes shown in FIG. 6, the paper sheet recognition unit 21 judges whether the images match (Step S30 of FIG. 12).

For example, the method according to the first embodiment can be used as the process for judging whether the two images are different. However, the judgment method of judging that the two images are different is not limited to this. A method that employs a pattern matching technology in which a correlation coefficient is used can also be adopted.

In the paper sheet recognition apparatus 1, the first light source 11 and the second light source 12 are adjusted and arranged such that the first thread image 201 captured by using the first light source 11 and the second thread image 202 captured by using the second light source 12, are position-shifted pattern images as shown in FIGS. 11A and 11B. Therefore, if the first thread image 201 and the second thread image 202 match (Yes at Step S30 of FIG. 12), the judgment is made that the first thread image and the second thread image are captured from the counterfeit paper sheet 100, and the motion thread 101 is absent in the paper sheet 100 (Step S35).

If the first thread image 201 and the second thread image 202 are judged to be different (No at Step S30), the judgment is made that the captured images are that of the motion thread 101. As in the first embodiment, the judgment that the paper sheet 100 has the motion thread 101 can be made based only on the result of this step.

In the present embodiment, however, the judgment can be made more accurately that the paper sheet 100 includes the motion thread 101, based on further ascertaining that the first thread image 201 and the second thread image 202 are shifted relative to each other by a predetermined distance in a predetermined direction.

Specifically, because it is known, based on the positional relation of the first light source 11 and the second light source 12, that the patterns in the first thread image 201 and the second thread image 202 will be shifted by the predetermined distance in the predetermined direction relative to each other, this fact is used in the judgment. That is, the images of the first thread image shifted by the predetermined distance in the predetermined direction based on the positional relation between the two light sources 11 and 12 are compared with the second thread image. The direction and the distance in which the image is to be shifted are previously stored in the storage unit 30 as information relating to the reference images 34.

Figure 13A:
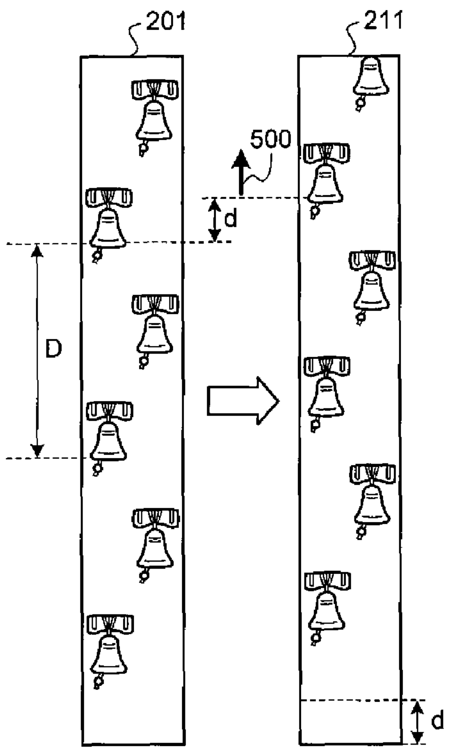
FIGS. 13A and 13B are drawings for explaining a method in which the images of the motion thread part according to the third embodiment are shifted and compared.
Figure 13B:
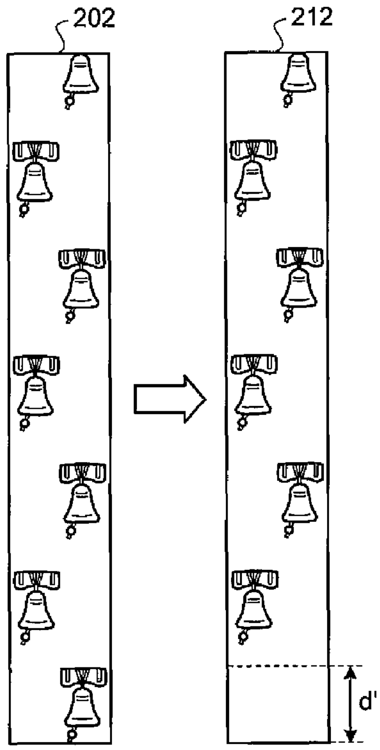

After the judgment is made that the two thread images 201 and 202 are different (No at Step S30 of FIG. 12), based on the information stored in the storage unit 30, the image processing unit 23 creates a first comparison image 211 that is shifted relative to the first thread image 201 by a distance d in the direction of an arrow 500, as shown in FIG. 13A (Step S31 of FIG. 12). Consequently, in the first comparison image 211 obtained after shifting the first thread image 201 by the distance d, a range up to a distance d from the edge opposite to the direction 500 of shift becomes a blank area without any pattern. Therefore, the image processing unit 23, as for the second thread image 202 shown in FIG. 13B, creates a second comparison image 212 that includes a blank area, where the bell design was included, up to a distance d' from the edge corresponding to the blank area of the first comparison image 211 (Step S31 of FIG. 12).

By comparing the first comparison image 211 and the second comparison image 212, a judgment is made whether the two are matching with within a predetermined acceptable range (Step S33). If the two images match (Yes at Step S33), it is judged that the motion thread 101 is present in the paper sheet 100 (Step S34). On the other hand, if the two images do not match (No at Step S33), it is judged that the motion thread 101 is absent in the paper sheet 100 (Step S35).

A case in which the patterns of the first thread image 201 and the second thread image 202 are captured in shifted positions by the predetermined distance in the predetermined direction is cited as an example. However, the present embodiment is not limited to this. For example, if there is a variation in the distance and the direction of shift of the pattern because of the variations in the positions of the icons forming the motion thread 101 and the optical properties of the micro lens, the first comparison image 211 is created from the first thread image 201 by shifting the direction and the distance within a predetermined range, and thereafter judgment is made.

The range of the direction and the distance of shift of the pattern is set such that the paper sheet 100 that has the motion thread 101 is not misjudged as not having the motion thread 101 because of variations in the production of the paper sheets 100.

The direction and the distance of shift of the pattern for creating the comparison image are set within the predetermined range so that the image obtained from a counterfeit paper sheet is not misjudged to be that of the motion thread 101. Specifically, for example, in FIG. 13A, the distance by which the image is shifted in the direction of the arrow 500 for creating the first comparison image 211 is set smaller than the distance D.

The judgment process (Step S33 of FIG. 12) performed at this stage is a process of judging whether, after the judgment is made that the first thread image 201 and the second thread image 202 do not match (No at Step S30), after shifting, the pattern of the first thread image 201 matches with the second thread image 202. In the case of the counterfeit paper sheet, the first thread image and the second thread image will be the same, for example, the image 201 shown in FIG. 13A, and will be judged to be a counterfeit in the first judgment process (No at Step S30). However, there is a possibility that a misjudgment that the two thread images are not matching could be made because of noise, etc., in the images, even for a counterfeit paper sheet (No at Step S30). In such a case, if the pattern of the image 201 shown in FIG. 13A is shifted by the distance D in the direction of the arrow 500, it will overlap with the position of adjacent pattern. Consequently, again a misjudgment is made that the shifted first thread image matches with the second thread image (Yes at Step S33 of FIG. 12). To avoid this, the range of the direction and the distance of shift of the pattern is limited by setting values, and the setting range is stored in the storage unit 30 in an associated form with the information relating to the reference images 34. Thus, even though the direction and the distance by which the pattern shifts vary according to the paper sheet 100, the presence or absence of the motion thread 101 can be judged accurately when the pattern shifts within the specified range.

Thus, the judgment can be made accurately whether the paper sheet 100 has the motion thread 101, by arranging the first light source 11 and the second light source 12 so as to obtain different images when capturing the image of the motion thread 101, and judging whether the image of the motion thread 101 obtained by using the first light source 11 and the image of the motion thread 101 obtained by using the second light source 12 are different.

Furthermore, the judgment can be made more accurately that the paper sheet 100 has the motion thread 101, by verifying that the image captured by using the first light source 11 and the image captured by using the second light source 12 satisfy the predetermined relation in accordance with the positions of the first light source 11 and the second light source 12, that is, by verifying that one image matches with the other image when it is shifted in the predetermined direction by the predetermined distance. Because comparison is performed by taking into account the variations in the actual positions of the icons in the motion thread 101, the judgment can be made accurately whether the motion thread 101 is present, even if there are variations in the obtained thread images according to the paper sheet 100.

Furthermore, the presence or absence of the motion thread 101 can be judged by using one line sensor 4; this is possible because of the property that the image of the motion thread 101 varies according to the viewing position. Thus, a compact and low-cost paper sheet recognition apparatus 1 can be realized as compared to when using a plurality of the sensors.

Fourth Embodiment

In the first to third embodiments, the first light source 11 and the second light source 12 are two different light sources. However, other aspects are possible so long as the paper sheet 100 can be irradiated with lights from different directions.

Figure 14A:
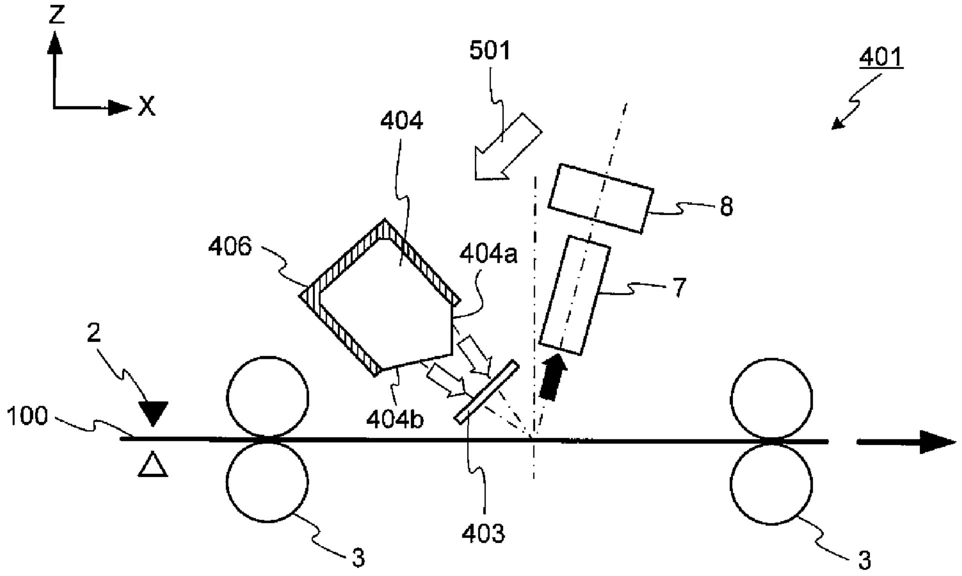
FIGS. 14A and 14B are schematic diagrams for explaining an overview of a paper sheet recognition apparatus that uses a light guiding body according to a fourth embodiment of the present invention.
Figure 14B:
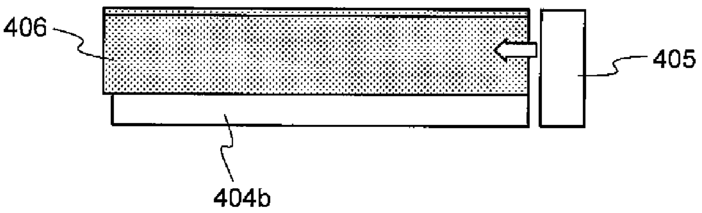

Specifically, a single optical source can be used so long as the paper sheet 100 is irradiated with the light, which is emitted from different directions, for example, as shown in FIGS. 14A and 14B, from two surfaces 404*a* and 404*b* of a light guiding body 404. FIG. 14A is a cross-sectional view of the light guiding body 404. FIG. 14B is a drawing of the light guiding body 404 shown in FIG. 14A when viewed from the direction of an arrow 501. The light guiding body 404 has a function of scattering and diffracting therewithin the light from a light source 405, such as, an LED, and reflecting the light by using a cover 406 thereof, thereby emitting the light from two different angles from the two surfaces 404*a* and 404*b* that are not covered by the cover 406.

The light guiding body 404 emits the light towards the paper sheet 100 simultaneously from two different directions. The light irradiated on the paper sheet 100 is controlled by a shutter mechanism 403 that is arranged between the light guiding body 404 and the paper sheet 100 as shown in FIG. 14A.

Figure 15:
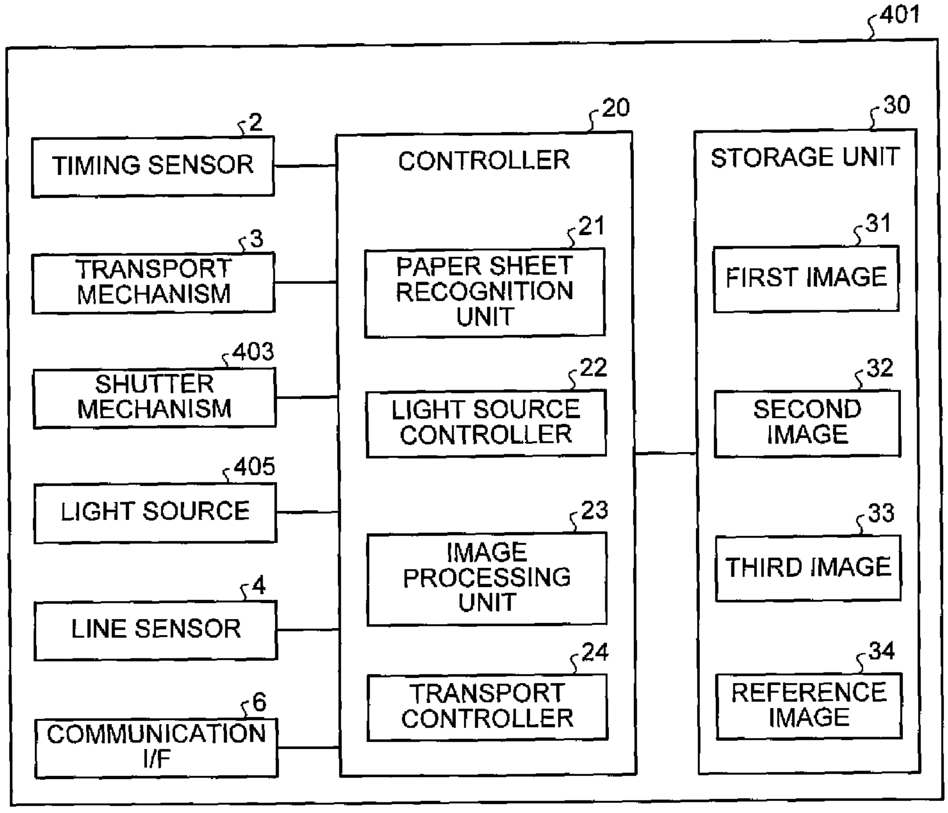
FIG. 15 is a block diagram of the paper sheet recognition apparatus according to the fourth embodiment.

A paper sheet recognition apparatus 401 according to the present embodiment includes a structure shown in FIG. 15. The present embodiment differs from the first embodiment in that a single light source 405 is used and the light emitted from the light source 405 is split into lights from two different directions by the light guiding body 404, and the shutter mechanism 403 is used to control the light irradiated towards the paper sheet 100 such that the light is irradiated from any one of the two directions.

A correspondence is established between the first light source 11 shown in FIG. 7 and the light emitted from the first surface 404*a* of the light guiding body 404 as well as the second light source 12 and the light emitted from the second surface 404*b* of the light guiding body 404. If a correspondence is established between the light emission timings shown in FIG. 8 and the control exerted on the shutter mechanism 403 by the light source controller 22, the alternating lighting control shown in FIG. 7 can be realized in the present embodiment. If alternating lighting is realized in this manner, functions and operations similar to those of the first embodiment can be realized and similar advantages can be attained.

Each of the first to fourth embodiments can be independent or any combination thereof is possible. Specifically, with regard to the judgment process of the motion thread 101 according to the first to third embodiments, the judgment process according to the first embodiment can be performed first, followed by the judgment process according to the second embodiment or the third embodiment. Alternatively, the judgment process according to all the embodiments can be performed. In this case, the next judgment process is performed only when a judgment result obtained in the previous judgment process indicates that the motion thread 101 is present. Specifically, when the judgment is made that the motion thread 101 is present after the judgment process is performed according to the first embodiment, the second embodiment or the third embodiment can be further applied to verify the judgment result obtained by applying the first embodiment. Thus, the judgment process relating to the presence or absence of the motion thread 101 can be performed more accurately.

As mentioned above, in the present embodiment, the paper sheet 100 being transported is irradiated with the lights from two different directions, and reflection images by using each light are captured. Therefore, the judgment can be made whether the paper sheet 100 has the motion thread 101. Specifically, the light is irradiated on the paper sheet 100 from directions such that the captured images of the motion thread 101 section will be different. Therefore, the judgment can be made accurately whether the motion thread 101 is present.

Because the image of the motion thread 101 is captured by using one line sensor 4 that is a light receiving sensor, and by arranging light sources at a plurality of positions, or by splitting the light emitted from one light source into two lights by using the light guiding body, a compact device can be realized as compared to when multiple light receiving sensors are used. Furthermore, the manufacturing cost of the device can be kept low as compared to when a plurality of light receiving sensors is used.

Because a plurality of paper sheet images can be captured by using the lights irradiated from different directions by exerting the alternating lighting control during a single passage of the paper sheet 100 being transported below the line sensor 4, high-speed processing can be realized.

Thus, the presence or absence of the motion thread 101 in the paper sheet 100 can be judged accurately in this manner and the judgment can be made with high speed and accuracy whether the paper sheet 100 is counterfeited.

As mentioned above, the present invention is useful for recognizing the authenticity of the paper sheet, in which the motion thread is used for preventing counterfeiting of the paper sheet, using a compact and low-cost paper sheet recognition apparatus.

According to the present invention, the light sources are arranged such that the paper sheet is irradiated with the lights from two different directions, two images of the paper sheet are captured using each of the light sources by controlling the light emission of the light sources, thread images included in the captured images are compared, and based on whether the two images are different, the presence or absence of the motion thread is judged. Therefore, the judgment can be made accurately whether the paper sheet has the motion thread. Furthermore, because the image of the paper sheet is captured using one sensor, a compact and low-cost device can be realized.

According to the present invention, based on the property of the motion thread, because the sensor is arranged at a position from where a clear image of the motion thread can be captured when the light is irradiated from two different directions and the image of the motion thread is captured by the sensor from that position, the judgment can be made accurately whether the paper sheet has the motion thread.

According to the present invention, the light emitted from a single light source is split by using the light guiding body so that the light is irradiated from two different directions, and the image is captured by using the light irradiated from each direction by controlling the shutter mechanism arranged between the light guiding body and the paper sheet. Therefore, a more compact device can be realized while maintaining the judgment accuracy of the motion thread.

According to the present invention, when the judgment is made that the thread images captured by using the lights irradiated from two different directions are different, the difference between the two images is calculated and compared with the threshold value, and the presence or absence of the motion thread is judged. Therefore, by a simple calculation process, the judgment can be made with high speed and accuracy whether the paper sheet has the motion thread. Even if the image to be judged includes noise, by setting a threshold value, the judgment can be made accurately without the process being affected by the noise.

According to the present invention, in addition to the judgment that the two thread images captured by using the lights irradiated from two different directions are different, the thread images are compared with the reference images that are created previously, and it is verified that each image is the motion thread image captured under the irradiated light. Therefore, the judgment can be made accurately whether the paper sheet has the motion thread.

According to the present invention, in addition to the judgment that the two thread images captured by using the lights irradiated from two different directions are different, it is verified whether, when one of the thread images is shifted, the shifted thread image matches with the other thread image. Therefore, when the motion thread in which the position of the same pattern varies is used, the judgment can be made accurately whether the paper sheet has the motion thread.

The invention claimed is:

1. A paper sheet recognition apparatus that recognizes a paper sheet having a motion thread in a thread part of which a pattern varies with a viewing angle, the paper sheet recognition apparatus comprising:

a first light source that irradiates the paper sheet with a light from a first direction;

a second light source that irradiates the paper sheet with a light from a second direction that is different from the first direction;

a light source controller that controls the first light source and the second light source so that the paper sheet is irradiated with the light from the first direction or the second direction;

a transport mechanism that transports the paper sheet;

a line sensor that receives a reflected light reflected from the paper sheet that is being transported by the transport mechanism and that is irradiated with the lights from the first direction and the second direction;

an image processing unit that creates, based on an output signal outputted from the line sensor, a first image captured by using the first light source and a second image captured by using the second light source; and a recognition unit that judges that the paper sheet has the motion thread if a first thread image, which is an image of the thread part included in the first image, and a second thread image, which is an image of the thread part included in the second image, are different and if an image obtained by shifting the first thread image by a predetermined distance in a predetermined direction, based on a visual relation between the first direction and the second direction from which the lights are irradiated towards the paper sheet, matches with the second thread image.

2. The paper sheet recognition apparatus according to claim 1, wherein the line sensor is arranged at a position above a surface of the paper sheet that is being transported by the transport mechanism and that has the motion thread thereon, the position is tilted by a predetermined angle from a plane that is substantially perpendicular to a transport plane of the paper sheet and is on a side opposite to the first and second directions from which the lights irradiate the paper sheet.

3. The paper sheet recognition apparatus according to claim 1, further comprising:

a shutter mechanism that is capable of separately blocking the lights irradiated towards the paper sheet from the first direction and the second direction, wherein the first light source and the second light source are realized by using a single light guiding body that emits a light towards the paper sheet from the first direction and the second direction, and the light source controller controls the shutter mechanism such that the paper sheet is irradiated with the light from the first direction or the second direction.

4. The paper sheet recognition apparatus according to claim 3, further comprising:

a third light source that irradiates a light from a side different from that of the line sensor relative to a transport plane of the paper sheet, wherein the image processing unit creates a transmission image of the paper sheet by using the third light source, and the recognition unit identifies a position of the thread part based on the transmission image created by the image processing unit.

5. The paper sheet recognition apparatus according to claim 1, wherein the recognition unit identifies a type of the paper sheet and a position of the thread part according to the type of the paper sheet.

6. The paper sheet recognition apparatus according to claim 1, wherein the recognition unit calculates a difference value between pixel values of the first thread image and those of the second thread image, and when the calculated difference value is greater than a predetermined threshold value, judges that the paper sheet has the motion thread.

7. The paper sheet recognition apparatus according to claim 1, further comprising:

a storage unit that stores therein a reference image corresponding to each of the first thread image and the second thread image, wherein the recognition unit judges that the paper sheet has the motion thread if the first thread image and the second thread image match with the corresponding reference images.

8. A paper sheet recognition method for recognizing a paper sheet having a motion thread in a thread part of which a pattern varies with a viewing angle, the method comprising:

first image capturing including capturing an image of the paper sheet by irradiating the paper sheet with a light from a first direction;

second image capturing including capturing an image of the paper sheet by irradiating the paper sheet with a light from a second direction that is different from the first direction;

first comparing including comparing a first thread image, which is an image of the thread part included in a first image captured at the first image capturing, with a second thread image, which is an image of the thread part included in a second image captured at the second image capturing;

second comparing including comparing an image obtained by shifting the first thread image within a predetermined range with the second thread image; and judging that the paper sheet has the motion thread when a comparison result obtained at the first comparing shows that the two images are different and when a comparison result obtained at the second comparing shows that the two images are matching.

9. The paper sheet recognition method according to claim 8, wherein the first image capturing and the second image capturing include capturing the image of the paper sheet from a position above a surface of the paper sheet that has the motion thread thereon, the position is tilted by a predetermined angle from a plane that is substantially perpendicular to a transport plane of the paper sheet and is on a side opposite to the first and second directions from which the lights irradiate the paper sheet.

10. The paper sheet recognition method according to claim 8, further comprising:

transmission image capturing including capturing a transmission image of the paper sheet; and first thread position identifying including identifying a position of the thread part based on the transmission image captured at the transmission image capturing, wherein the first comparing includes extracting and comparing an image of the motion thread, based on position information identified at the first thread position identifying.

11. The paper sheet recognition method according to claim 8, further comprising:

second thread position identifying including identifying a type of the paper sheet and identifying a position of the thread part according to the type of the paper sheet, wherein the first comparing includes extracting and comparing the first thread image and the second thread image based on position information identified at the second thread position identifying.

12. The paper sheet recognition method according to claim 8, wherein the first comparing includes calculating a difference between pixel values of the first thread image and the second thread image, and the judging includes judging that the paper sheet has the motion thread when calculated difference value obtained at the first comparing is greater than a predetermined threshold value.

13. The paper sheet recognition method according to claim 8, wherein the first comparing includes comparing the first thread image and the second thread image with corresponding reference images, and the judging includes judging that the paper sheet has the motion thread when a comparison result obtained at the first comparing shows that the two images match with the corresponding reference images respectively.

14. A paper sheet recognition apparatus that recognizes a paper sheet having a motion thread in a thread part of which a pattern varies with a viewing angle, the paper sheet recognition apparatus comprising:

a light source that irradiates the paper sheet with a light from a plurality of directions;

a line sensor that receives a reflected light reflected from the paper sheet that is irradiated with the light from the light source from each direction;

an image processing unit that creates, based on an output signal outputted from the line sensor, a plurality of paper sheet images captured by using the light irradiated by the light source from each direction; and a recognition unit that judges whether the paper sheet has the motion thread by comparing the images of the thread part included in the paper sheet images created by the image processing unit, wherein a first thread image of the thread part and a second thread imaqe of the thread part are captured by irradiating the paper sheet from different angles, and wherein the recognition unit judges that the paper sheet has the motion thread if the first thread image and the second thread image are different and an image obtained by shifting the first thread image matches with the second thread image.

* * * * *